(12) United States Patent
Wang et al.

(10) Patent No.: US 11,649,361 B2
(45) Date of Patent: May 16, 2023

(54) STAIN-BLOCKING POLYMERS, PRIMERS, KITS, AND METHODS

(71) Applicant: SWIMC LLC, Cleveland, OH (US)

(72) Inventors: Hsuan-Chin Wang, Lake in the Hills, IL (US); Mary Jane Hibben, Elburn, IL (US)

(73) Assignee: SWIMC LLC, Cleveland, OH (US)

( * ) Notice: Subject to any disclaimer, the term of this patent is extended or adjusted under 35 U.S.C. 154(b) by 27 days.

(21) Appl. No.: 17/508,881

(22) Filed: Oct. 22, 2021

(65) Prior Publication Data

US 2022/0154008 A1 May 19, 2022

Related U.S. Application Data

(63) Continuation of application No. 17/179,007, filed on Feb. 18, 2021, now Pat. No. 11,180,665.

(60) Provisional application No. 62/979,931, filed on Feb. 21, 2020.

(51) Int. Cl.
| | | |
|---|---|---|
| *C09D 7/43* | (2018.01) | |
| *C09D 133/08* | (2006.01) | |
| *C09D 5/00* | (2006.01) | |
| *C09D 5/02* | (2006.01) | |

(52) U.S. Cl.
CPC ............ *C09D 5/002* (2013.01); *C09D 5/028* (2013.01); *C09D 7/43* (2018.01); *C09D 133/08* (2013.01)

(58) Field of Classification Search
CPC .......... C09D 5/002; C09D 7/43; C09D 5/028; C09D 133/08
USPC .................................................... 106/287.24
See application file for complete search history.

(56) References Cited

U.S. PATENT DOCUMENTS

| | | | |
|---|---|---|---|
| 2,795,564 A | 6/1957 | Conn et al. | |
| 3,492,252 A | 1/1970 | Euchner et al. | |
| 3,852,087 A | 12/1974 | Nordyke et al. | |
| 3,969,293 A | 7/1976 | White et al. | |
| 4,014,838 A | 3/1977 | Kraft et al. | |
| 4,016,127 A | 4/1977 | Larsson et al. | |
| 4,021,398 A | 5/1977 | Gilman et al. | |
| 4,075,394 A | 2/1978 | Meyer | |
| 4,218,516 A | 8/1980 | Meyer | |
| 4,284,740 A | 8/1981 | Chang | |
| 4,492,780 A | 1/1985 | Zimmerschied et al. | |
| 4,542,171 A | 9/1985 | Elser et al. | |
| 4,544,697 A | 10/1985 | Pickleman et al. | |
| 4,582,663 A | 4/1986 | Pickleman et al. | |
| 4,686,260 A | 8/1987 | Lindemann et al. | |
| 4,708,923 A | 11/1987 | Myers, Jr. et al. | |
| 4,863,979 A | 9/1989 | Beyersdorf et al. | |
| 4,973,670 A | 11/1990 | McDonald et al. | |
| 4,999,218 A | 3/1991 | Rehmer et al. | |
| 5,006,617 A | 4/1991 | Engel et al. | |
| 5,122,571 A | 6/1992 | Westeppe et al. | |
| 5,162,413 A | 11/1992 | Kissel | |
| 5,268,431 A | 12/1993 | Burroway et al. | |
| 5,306,744 A | 4/1994 | Wolfersberger et al. | |
| 5,312,863 A | 5/1994 | Van Rheenen et al. | |
| 5,320,872 A | 6/1994 | McNeel et al. | |
| 5,399,621 A | 3/1995 | Kohlhammer | |
| 5,460,644 A | 10/1995 | Thomassen | |
| 5,527,619 A | 6/1996 | Rokowski et al. | |
| 5,529,811 A | 6/1996 | Sinko | |
| 5,605,972 A | 2/1997 | Kohlhammer et al. | |
| 5,668,194 A | 9/1997 | Ando et al. | |
| 5,681,880 A | 10/1997 | Ulrich et al. | |
| 5,714,539 A | 2/1998 | Perez et al. | |
| 5,744,540 A | 4/1998 | Baumstark et al. | |
| 5,747,585 A | 5/1998 | Mitacek et al. | |
| 5,759,705 A | 6/1998 | Sinko | |
| 5,800,873 A | 9/1998 | Enthoven et al. | |

(Continued)

FOREIGN PATENT DOCUMENTS

| | | |
|---|---|---|
| CN | 102115630 A | 7/2011 |
| CN | 104341547 A | 2/2015 |

(Continued)

OTHER PUBLICATIONS

International Standard ASTM D7514-14 (2014) "Standard Test Method for Evaluating Ink Stainblocking of Architectural Paint Systems by Visual Assessment," 4 pages.

(Continued)

*Primary Examiner* — Kelechi C Egwim
(74) *Attorney, Agent, or Firm* — Mueting Raasch Group

(57) ABSTRACT

Stain-blocking polymers, as well as primers, kits, and methods that include such polymers, wherein the stain-blocking polymer is an emulsion latex polymer including interpolymerized monomers including: at least 1 wt-%, based on the total weight of the interpolymerized monomers, of one or more acrylic acid ester monomers of Formula (I):

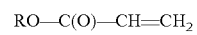

wherein: R is a branched alkyl group having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene; and wherein the stain-blocking primer includes at least 10 wt-%, based on the total nonvolatile weight of the primer, of the emulsion latex polymer; an aqueous carrier; and optionally, one or more additives selected from a surfactant, thickener, coalescent, biocide, mildewcide, colorant, and combinations thereof.

20 Claims, No Drawings

(56) References Cited

U.S. PATENT DOCUMENTS

| | | |
|---|---|---|
| 5,891,294 A | 4/1999 | Shih |
| 5,912,294 A | 6/1999 | Schade |
| 5,922,777 A | 7/1999 | Van Rheenen |
| 5,993,534 A | 11/1999 | Winterowd |
| 6,103,316 A | 8/2000 | Tran et al. |
| 6,113,989 A | 9/2000 | Sinko |
| 6,218,012 B1 | 4/2001 | Rota et al. |
| 6,245,141 B1 | 6/2001 | Walker et al. |
| 6,262,144 B1 | 7/2001 | Zhao et al. |
| 6,399,050 B1 | 6/2002 | Pasquet et al. |
| 6,423,769 B1 | 7/2002 | Gerst et al. |
| 6,429,251 B2 | 8/2002 | Mayer et al. |
| 6,444,749 B2 | 9/2002 | Mestach et al. |
| 6,461,728 B2 | 10/2002 | Weiss et al. |
| 6,482,393 B1 | 11/2002 | Schehlmann et al. |
| 6,531,223 B1 | 3/2003 | Rota et al. |
| 6,533,856 B1 | 3/2003 | Hodges et al. |
| 6,534,590 B1 | 3/2003 | Aso et al. |
| 6,660,788 B2 | 12/2003 | Loos et al. |
| 6,706,801 B1 | 3/2004 | Blum et al. |
| 6,710,118 B2 | 3/2004 | Koppers et al. |
| 6,716,949 B2 | 4/2004 | Ganapathiappan et al. |
| 6,727,327 B1 | 4/2004 | Gerst et al. |
| 6,759,490 B1 | 7/2004 | Gerst et al. |
| 6,815,466 B2 | 11/2004 | Van Rheenen |
| 6,818,697 B2 | 11/2004 | Zhang et al. |
| 6,841,595 B2 | 1/2005 | Brizzolara et al. |
| 6,930,142 B2 | 8/2005 | Yanagiguchi et al. |
| 6,930,143 B2 | 8/2005 | Harris et al. |
| 7,015,294 B2 | 3/2006 | Dausch et al. |
| 7,056,413 B2 | 6/2006 | Caspari et al. |
| 7,176,258 B2 | 2/2007 | Morihiro et al. |
| 7,183,358 B2 | 2/2007 | Bastelberger et al. |
| 7,211,625 B2 | 5/2007 | Tsuji et al. |
| 7,674,868 B2 | 3/2010 | Minge et al. |
| 7,695,813 B2 | 4/2010 | Schultes et al. |
| 7,709,052 B2 | 5/2010 | Dyllick-Brenzinger et al. |
| 7,829,070 B2 | 11/2010 | Nguyen-Kim et al. |
| 7,858,076 B2 | 12/2010 | Kim et al. |
| 7,985,789 B2 | 7/2011 | Perez et al. |
| 8,124,689 B2 | 2/2012 | Loubert et al. |
| 8,143,327 B2 | 3/2012 | Hayashi et al. |
| 8,153,721 B2 | 4/2012 | Balk et al. |
| 8,303,943 B2 | 11/2012 | Kim |
| 8,541,524 B2 | 9/2013 | Fringant |
| 8,568,750 B2 | 10/2013 | Harada |
| 8,575,265 B2 | 11/2013 | Liaw et al. |
| 8,637,160 B2 | 1/2014 | Schmidt-Thuemmes et al. |
| 8,673,277 B2 | 3/2014 | Tamareselvy et al. |
| 8,691,907 B2 | 4/2014 | Gebhard et al. |
| 8,722,788 B2 | 5/2014 | Schultes et al. |
| 8,822,592 B2 | 9/2014 | Kok et al. |
| 8,912,273 B2 | 12/2014 | Venkatesh |
| 8,933,169 B2 | 1/2015 | Schattka et al. |
| 8,992,708 B2 | 3/2015 | Schumacher et al. |
| 9,006,361 B2 | 4/2015 | Behrens et al. |
| 9,034,432 B2 | 5/2015 | Uriel |
| 9,096,697 B2 | 5/2015 | Mueller et al. |
| 9,238,747 B2 | 1/2016 | Wildeson et al. |
| 9,334,398 B2 | 5/2016 | Al-Hellani et al. |
| 9,562,162 B2 | 2/2017 | Wildeson et al. |
| 9,701,829 B2 | 7/2017 | Jhaveri et al. |
| 9,902,785 B2 | 2/2018 | Belmonte et al. |
| 9,976,029 B2 | 5/2018 | Thiem et al. |
| 10,106,679 B2 | 10/2018 | Jhaveri et al. |
| 10,150,824 B2 | 12/2018 | Nakao |
| 10,266,666 B2 | 4/2019 | Sakimura et al. |
| 10,301,464 B2 | 5/2019 | Inoubli et al. |
| 2002/0004552 A1 | 1/2002 | Deng et al. |
| 2002/0082319 A1* | 6/2002 | Zhao ............... D21H 19/58 523/201 |
| 2004/0024135 A1 | 2/2004 | Verge et al. |
| 2005/0069698 A1 | 3/2005 | Eubanks et al. |
| 2006/0106142 A1 | 5/2006 | Kim et al. |
| 2006/0177649 A1 | 8/2006 | Clark et al. |
| 2006/0235131 A1 | 10/2006 | Hughes et al. |
| 2007/0213445 A1 | 9/2007 | Klijn et al. |
| 2008/0193405 A1 | 8/2008 | Mukherjee et al. |
| 2010/0047598 A1 | 2/2010 | Sullivan et al. |
| 2012/0121921 A1 | 5/2012 | Cosyns et al. |
| 2013/0004671 A1 | 1/2013 | Wildeson et al. |
| 2013/0196162 A1 | 8/2013 | Yanan et al. |
| 2014/0113070 A1 | 4/2014 | Schumann et al. |
| 2015/0125712 A1 | 5/2015 | Clawson et al. |
| 2016/0279823 A1 | 9/2016 | Staffel et al. |
| 2019/0100613 A1* | 4/2019 | Balk ............... C09D 151/003 |
| 2019/0177609 A1 | 6/2019 | Pillay et al. |

FOREIGN PATENT DOCUMENTS

| | | |
|---|---|---|
| DE | 19811314 A1 | 9/1999 |
| FR | 2797633 | 2/2001 |
| JP | H06306123 A | 11/1994 |
| JP | 7-148459 A | 6/1995 |
| JP | 8-225767 A | 9/1996 |
| JP | 2002088266 A | 3/2002 |
| JP | 2016-535691 A | 11/2016 |
| WO | WO 2000/071631 A1 | 11/2000 |
| WO | WO 2003/070832 A2 | 8/2003 |
| WO | WO 2003/070832 A3 | 8/2003 |
| WO | WO 2004/018575 A1 | 3/2004 |
| WO | WO 2005/068520 A1 | 7/2005 |
| WO | WO 2011/073164 A1 | 6/2011 |
| WO | WO 2013/147701 A1 | 10/2013 |

OTHER PUBLICATIONS

International Standard ASTM 3359-17 (2017) "Standard Test Methods for Rating Adhesion by Tape Test," 9 pages.
International Search Report and Written Opinion for application No. PCT/US2021/018494, dated May 25, 2021, 7 pages.

* cited by examiner

STAIN-BLOCKING POLYMERS, PRIMERS, KITS, AND METHODS

CROSS-REFERENCE TO RELATED APPLICATIONS

This application is a continuation of U.S. patent application Ser. No. 17/179,007, filed Feb. 18, 2021, which claims the benefit of U.S. Provisional Patent Application Ser. No. 62/979,931, filed on Feb. 21, 2020, the disclosures of which are incorporated herein by reference in their entireties.

BACKGROUND

Aqueous coating compositions have found limited success in providing coatings with desirable properties for multiple substrates. Typically, transitioning from solvent-borne compositions to aqueous coating compositions, while providing environmental advantages, have resulted in sacrificing properties. The balance of coating performance attributes required for a coating composition to be suitable for use on a variety of substrates is not easily achieved with aqueous coating compositions.

Accordingly, aqueous coating compositions have found limited success in providing coatings with desirable properties for forming primers, especially those with stain-blocking ability.

Stain-blocking primers (i.e., coating compositions) are applied to the surfaces of substrates, including uncoated surfaces or previously coated substrates. These coatings promote adhesion and also serve as a barrier coating to underlying polar or nonpolar staining agents. Substrates frequently contain soluble or mobile staining agents. Given the nature of water-based coatings, the staining agents often leach from the substrate into and/or through the coating, causing surface discoloration of the coating. For example, tannins contained in woods such as redwood, cedar, elm, merbau, and mahogany can leach from the substrate into the coating, causing tannin staining, which appears as discoloration on the surface of the coating. The visual appearance of localized stains or discoloration also can be manifested from extractives of previously coated substrates due to substrate exposure to water or humidity spots. In addition, salts contained in cementitious substrates often cause efflorescence, which is a staining caused by the migration of the salt from the substrate to the paint coating, where it appears as white deposits. Staining of the substrate, and of coatings previously applied to the substrate, can also be caused by sources external to the substrate. For example, cigarette smoke causes nicotine staining, which discolors light colored coatings inks from pens cause marker stains on the substrate. Each of these types of staining is highly undesirable in coatings.

What is needed in the art are aqueous coating compositions that function as primers having improved stain-blocking performance.

SUMMARY OF THE DISCLOSURE

The present disclosure provides stain-blocking polymers, as well as primers, kits, and methods that include such stain-blocking polymers, wherein the stain-blocking polymer is an emulsion latex polymer.

In one embodiment, a stain-blocking primer is provided that includes: at least 10 wt-%, based on the total nonvolatile weight of the primer, of an emulsion latex polymer including interpolymerized monomers including: at least 1 wt-%, based on the total weight of the interpolymerized monomers, of one or more acrylic acid ester monomers of Formula (I):

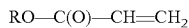

$$RO-C(O)-CH=CH_2$$

wherein: R is a branched alkyl group having a tertiary carbon atom, a cycloaliphatic group, or a combination thereof (in certain embodiments, and R has 20 or fewer carbon atoms); optionally, one or more (meth)acrylate monomers (i.e., acrylate or methacrylate monomers) selected from n-butyl (meth)acrylate, ethylhexyl (meth)acrylate, methyl (meth)acrylate, and combinations thereof; optionally, one or more wet adhesion monomers; and optionally, styrene; an aqueous carrier; and optionally, one or more additives selected from a surfactant, thickener, coalescent, biocide, mildewcide, colorant (e.g., inorganic pigment), and combinations thereof.

In another embodiment, a stain-blocking polymer is provided that includes: an emulsion latex polymer comprising interpolymerized monomers including: at least 1 wt-% of one or more acrylic acid ester monomers of Formula (I):

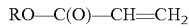

$$RO-C(O)-CH=CH_2$$

wherein: R is a branched alkyl having a tertiary carbon atom (in certain embodiments, R has 20 or fewer carbon atoms); at least 10 wt-% of one or more (meth)acrylate monomers selected from n-butyl (meth)acrylate, ethylhexyl (meth)acrylate, methyl (meth)acrylate, and combinations thereof; and at least 1 wt-% styrene; wherein the weight percentages are based on the total weight of the interpolymerized monomers; wherein a hardened coating formed from the stain-blocking polymer has one or more of the following properties:

a stain-blocking performance, based on the Stainblocking Test described in the Examples Section (based on ASTM D7514-14), characterized by a ΔE value of: at most 20, preferably at most 18, for a black water-washable marker (e.g., Marks a Lot Black); and/or at most 16 for a blue water-washable marker (e.g., Window Marker Blue); and/or at most 15, preferably at most 12, for a green water-washable marker (e.g., Window Marker Green);

an adhesion performance of at least 2 based on the ASTM 3359 Cross-cut Adhesion Test described in the Examples Section; and a pendulum hardness of at least 4 based on the König Pendulum Hardness Test described in the Examples Section.

In another embodiment, a stained substrate having a stain-blocking polymer coated thereon is provided, wherein the stain-blocking polymer is an emulsion latex polymer including interpolymerized monomers including: at least 1 wt-%, based on the total weight of the interpolymerized monomers, of one or more acrylic acid ester monomers of Formula (I):

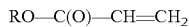

$$RO-C(O)-CH=CH_2$$

wherein: R is a branched alkyl having a tertiary carbon atom, a cycloaliphatic group, or a combination thereof (in certain embodiments, R has 20 or fewer carbon atoms); optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene.

In another embodiment, is a kit for making a stain-blocking primer that includes: an emulsion latex polymer including interpolymerized monomers including: at least 1 wt-%, based on the total weight of the interpolymerized monomers, of one or more acrylic acid ester monomers of Formula (I):

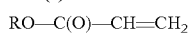

$$RO-C(O)-CH=CH_2$$

wherein: R is a branched alkyl having a tertiary carbon atom, a cycloaliphatic group, or a combination thereof (in certain embodiments, R has 20 or fewer carbon atoms); optionally, one or more (meth)acrylate monomers selected from n-butyl (meth)acrylate, ethylhexyl (meth)acrylate, methyl (meth) acrylate, and combinations thereof; optionally, one or more wet adhesion monomers; and optionally, styrene; and instructions for forming a stain-blocking primer, wherein a coating formed from the primer has a stain-blocking performance, based on the Stain-blocking Test described in the Examples Section (based on ASTM D7514-14), characterized by a ΔE value of: at most 20, preferably at most 18, for a water-washable black marker (e.g., Marks a Lot Black); or at most 16 for a water-washable blue marker (e.g., Window Marker Blue); or at most 15, preferably at most 12, for a water-washable green marker (e.g., Window Marker Green). In certain embodiments, at least one of these colored marker values (black, blue, or green) is met. In certain preferred embodiments, two of these three colored marker (black, blue, or green) values are met. In certain more preferred embodiments, all three colored marker (black, blue, or green) values are met.

In another embodiment, a method is formed that includes: causing a stain-blocking polymer to be applied to a stained substrate, wherein the stain-blocking polymer is an emulsion latex polymer including interpolymerized monomers including: at least 1 wt-%, based on the total weight of the interpolymerized monomers, of one or more acrylic acid ester monomers of Formula (I):

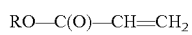

$$RO-C(O)-CH=CH_2$$

wherein: R is a branched alkyl having a tertiary carbon atom, a cycloaliphatic group, or a combination thereof (in certain embodiments, R has 20 or fewer carbon atoms); optionally, one or more (meth)acrylate monomers selected from n-butyl (meth)acrylate, ethylhexyl (meth)acrylate, methyl (meth) acrylate, and combinations thereof optionally, one or more wet adhesion monomers; and optionally, styrene.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "stain" as used herein includes any mark, blemish., discoloration, or any deposit whether or not visible or readily apparent to the naked eye. The term "stain" thus includes marks caused by inks, crayons, lipstick, grease pencils, smoke residue, tannins, water extracts, and the like. These stains may be found on residential or commercial walls as graffiti, markings from pens or color markers, on or native to wooden substrates, on wood-composite substrates, on concrete substrates, on paper substrates (such as wall board coverings), and on other substrates that are normally painted with one or more liquid coatings.

The term "stain-blocking" as used herein means binding, blocking or masking a stain where it cannot be seen, or is substantially less visible, once one or more liquid coatings are applied and dried, or in those cases where the stain is not visible or only slightly visible, that the stain cannot migrate through the one or more subsequently applied and dried liquid coatings. This is in contrast to a polymer or primer that is "stain-proof" or "stain-resistant" or "stain-repelling."

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides stain-blocking polymers, as well as primers, kits, and methods that include such stain-blocking polymers, wherein the stain-blocking polymer is an emulsion latex polymer.

In one embodiment, a stain-blocking primer is provided. As used herein, a primer is a coating composition that forms a continuous coating (e.g., by rolling, brushing, spraying) on a substrate such as wood (e.g., redwood, cedar, elm, merbau, and mahogany), metal (e.g., steel), etc., which adheres well and is sandable when dry. Typically, a primer is used between a substrate, whether previously coated or not, and a topcoat such as a paint.

Herein, the primer is used to hide or block a staining agent in or on a substrate (i.e., a stained substrate) from showing through the topcoat. That is, the primer of the present disclosure acts as a barrier coating to a variety of underlying staining agents (whether polar or non-polar, hydrophilic or hydrophobic), such as tannins, inks, crayons, lipstick, grease pencils, smoke residue, water extracts, and the like, which can leached out of the underlying substrate. This is in contrast to surface staining and snail trails that result from a component (e.g., surfactant) leaching out of the topcoat.

Thus, the present disclosure also provides a stained substrate (i.e., a substrate such as wood containing a staining agent, such as tannins, inks, etc.) having a stain-blocking polymer, which may be included in a stain-blocking primer, coated thereon. The substrate may include a metal, wood, wood composite, concrete, paper (such as wall board coverings), and other such substrates that are normally painted with one or more liquid coatings. In some embodiments, the substrate can be a primed surface and even a previously painted surface.

The primers of the present disclosure are aqueous coating compositions, preferably have a viscosity of 60-120 units measured by Krebs Viscometer at room temperature (suitable for spray, roll, or brush).

A hardened coating (i.e., dry film) formed from a latex polymer described herein (or aqueous composition in the form of a primer including a latex polymer described herein) on a substrate surface (e.g., a wood or metal surface), has one or more of the following properties:

a stain-blocking performance, based on the Stainblocking Test, characterized by a ΔE value of: at most 20, preferably at most 18, for a water-washable black marker (e.g., Marks a Lot Black); and/or at most 16 for a water-washable blue marker (e.g., Window Marker Blue); and/or at most 15, preferably at most 12, for a water-washable green marker (e.g., Window Marker Green) (or in certain embodiments, such as for single-stage latex polymers, the ΔE value is: at most 14 for black water-washable marker; at most 7 for a blue water-washable marker; and/or at most 8 for a green water-washable marker);

an adhesion performance of at least 2 based on the ASTM 3359 Cross-cut Adhesion Test described in the Examples Section (using a coating thickness of 3 mils (0.0762 mm) wet film on cedar wood or dull matte steel; and a pendulum hardness (which demonstrates sandability) of at least 4 based on the König Pendulum Hardness Test described in the Examples Section (using a coating thickness of 10 mil (0.254 mm) wet film on a smooth glass plate and allowed to air dry for 24 hours (in certain embodiments, for 7 days) at ambient temperature using a BYK König pendulum hardness tester at a 3° angle).

In certain embodiments, at least one of these colored marker values (black, blue, or green) is met by a hardened coating. In certain preferred embodiments, two of these three colored marker (black, blue, or green) values are met. In certain more preferred embodiments, all three colored marker (black, blue, or green) values are met.

Preferably, a hardened coating of the present disclosure includes all of these characteristics—stain-blocking performance, adhesion performance, and pendulum hardness.

For these tests, the primer formulation is a flat primer formulation that includes the emulsion latex polymer of the present disclosure, a pigment grind, a coalescent, a biocide (1,2-benzisothiazolin-3-one), sodium nitrite, rheology modifiers (i.e., thickeners such as hydrophobically modified polyether and hydrophobically modified ethylene oxide urethane) used in amounts to achieve coalescence below 50° F. and a KU viscosity range of 100±3.

The emulsion latex polymer (i.e., emulsion polymerized latex polymer) includes interpolymerized monomers including: at least 1 wt-%, or at least 2 wt-% (in certain embodiments, at least 1 wt-% to less than 20 wt-%), based on the total weight of the interpolymerized monomers, of one or more acrylic acid ester monomers of Formula (I):

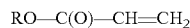

wherein: R is a branched alkyl group having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene.

In certain embodiments, the acrylic acid ester monomers of Formula (I) have a homopolymer glass transition temperature (Tg) of less than 110° C., or less than 50° C. In certain embodiments, the acrylic acid ester monomers of Formula (I) have a homopolymer Tg of at least 20° C., or at least 30° C.

In certain embodiments, a mixture of the acrylic acid ester monomers of Formula (I) are used to form the emulsion latex polymer.

In certain embodiments, R of Formula (I) is a branched alkyl group having a tertiary carbon atom, a cycloaliphatic group, or a combination thereof (e.g., a cyclohexane group with a t-butyl substituent).

In certain embodiments, R of Formula (I) has no more than 20 carbon atoms (i.e., 20 or fewer carbon atoms), no more than 16 carbon atoms, no more than 12 carbon atoms, no more than 10 carbon atoms, no more than 6 carbon atoms, or no more than 4 carbon atoms.

In certain embodiments, R of Formula (I) is a branched alkyl group having a tertiary carbon atom. In certain embodiments, R of Formula (I) is a branched alkyl group of 4 to 10 carbon atoms having a tertiary carbon atom.

In certain embodiments, the one or more monomers of Formula (I) are selected from isobornyl acrylate, cyclohexyl acrylate, t-butyl acrylate, and a mixture thereof. In certain embodiments, the one or more monomers of Formula (I) comprise t-butyl acrylate.

In certain embodiments, the emulsion latex polymer includes at least 1 wt-%, at least 2 wt-%, at least 5 wt-%, of one or more monomers of Formula (I), based on the total weight of the interpolymerized monomers. In certain embodiments, the emulsion latex polymer includes less than 20 wt-%, up to 15 wt-% (including 15 wt-%), or up to 10 wt-%, of one or more monomers of Formula (I), based on the total weight of the interpolymerized monomers.

In certain embodiments, the interpolymerized monomers of the emulsion latex polymer include one or more (meth)acrylate monomers selected from n-butyl (meth)acrylate, ethylhexyl (meth)acrylate, methyl (meth)acrylate, and combinations thereof. In certain embodiments, the emulsion latex polymer includes at least 10 wt-%, at least 20 wt-%, at least 30 wt-%, at least 40 wt-%, at least 50 wt-%, at least 60 wt-%, at least 70 wt-%, at least 75 wt-%, at least 80 wt-%, at least 83 wt-%, at least 84 wt-%, least 85 wt-%, or at least 90 wt-%, of these one or more (meth)acrylate monomers (e.g., two or more (meth)acrylate monomers), based on the total weight of the interpolymerized monomers. In certain embodiments, the emulsion latex polymer includes up to 99 wt-%, up to 98 wt-%, or up to 95 wt-%, of these one or more (meth)acrylate monomers (e.g., two or more (meth)acrylate monomers), based on the total weight of the interpolymerized monomers.

In certain embodiments, if the interpolymerized monomers of the emulsion latex polymer include n-butyl methacrylate (n-BMA), it is present in an amount of no more than 12 wt-%, based on the total weight of the interpolymerized monomers. While not being bound by theory, it is believed that n-BMA negates the benefits of the monomer of Formula (I).

In certain embodiments, the interpolymerized monomers of the emulsion latex polymer include one or more wet adhesion monomers. Examples of wet adhesion monomers include N-(2-methacryloyloxyethyl) ethylene urea (available as a 50% aqueous solution under the tradename SIPOMER WAM E W 50, as a 50% methyl methacrylate solution under the tradename SIPOMER WAM E MMA50, or as a 25% methyl methacrylate solution under the tradename SIPOMER WAM E MMA25, all from Solvay), 1-(2-((3-(allyloxy)-2-hydroxyproypl)amino)ethyl)imidazolidine-2-one (available as a 90 wt-% aqueous solution under the tradename SIPOMER WAM from Solvay), N-(2-methacryloyloxyethyl) ethylene urea (available as a 50% aqueous solution under the tradename VISIOMER MEEU 50 W from Evonik Industries AG), and combinations thereof. In certain embodiments, the emulsion latex polymer includes at least 0.2 wt-% of one or more wet adhesion monomers, based on the total weight of the interpolymerized monomers. In certain embodiments, the emulsion latex polymer includes up to 2.0 wt-%, or up to 1.0 wt-%, of one or more wet adhesion monomers, based on the total weight of the interpolymerized monomers.

In certain embodiments, the interpolymerized monomers of the emulsion latex polymer include styrene. In certain embodiments, the emulsion latex polymer includes at least 1 wt-%, at least 5 wt-%, at least 10 wt-%, or at least 15 wt-%, styrene, based on the total weight of the interpolymerized monomers. In certain embodiments, the emulsion latex polymer includes up to 75 wt-%, or up to 50 wt-% styrene, based on the total weight of the interpolymerized monomers.

In certain embodiments, a stain-blocking polymer is an emulsion latex polymer that includes interpolymerized monomers including: at least 1 wt-%, or at least 2 wt-%, of one or more acrylic acid ester monomers of Formula (I):

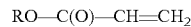

wherein: R is a branched alkyl having a tertiary carbon atom (in certain embodiments, R has 20 or fewer carbon atoms); at least 10 wt-% of one or more (meth)acrylate monomers selected from n-butyl (meth)acrylate, ethylhexyl (meth)acrylate, methyl (meth)acrylate, and combinations thereof; and at least 1 wt-%, at least 5 wt-%, at least 10 wt-%, or at least 15 wt-%, styrene; wherein the weight percentages are based on the total weight of the interpolymerized monomers.

In certain embodiments, the latex polymer is a single stage latex polymer. In certain embodiments, the latex polymer is a multistage latex polymer, such as a gradient Tg latex polymer or a core-shell(s) latex polymer. In certain embodiments, the emulsion latex polymer is a two- or more-stage emulsion latex polymer (e.g., resulting from a power feed process).

In this context, the term "multistage" when used with respect to a latex polymer means the polymer was made using discrete charges of two or more monomers, made using a varying (e.g., continuously varying) charge of two or more monomers, or made using a combination of both discrete charges and varying charges of two or more monomers. A multistage polymer is distinct from a single stage polymer made using one type of monomer blend with distinct polymer seed particles. Frequently, a multistage polymer consists of polymer stages with different Tg's, where the higher Tg stages are considered the hard stages and the lower Tg stages are considered the soft stages.

Usually, a multistage latex will not exhibit a single Tg inflection point as measured by differential scanning calorimetry (DSC). For example, a DSC curve for a multistage latex made using discrete charges of two or more monomers may exhibit two or more Tg inflection points. Also, a DSC curve for a multistage latex made using a continuously varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

In certain embodiments, latex polymers (whether single stage or multistage) are typically made using seed particles as a nucleating agent for polymerization. Such seed particles may be in the form of inorganic particulate seed (e.g., clay or glass particles), preformed particulate polymer seed (latex or non-latex polymer seed), or particulate seed polymer formed in situ. Polymer seed can be an emulsion polymerized polymer seed, but does not encompass polymeric surfactant. In certain embodiments, seed particles are used in an amount of no more than 10 wt-%, or no more than 5 wt-%, based on latex polymer solids in the final latex.

Herein, whether inorganic particulate seed, preformed particulate polymer seed, or particulate seed polymer formed in situ, such seed particles will not be deemed to provide a stage of a multistage polymer or to provide a basis for designating a single stage polymer made using such seed polymer as a multistage polymer.

In certain embodiments, the one or more monomers of Formula (I) is present in a hard stage of the emulsion latex polymer.

Latex polymers described herein may or may not have a glass transition temperature that is measurable. As used herein, the term "glass transition temperature" or "Tg" refers to the temperature at which an amorphous, solid material undergoes a reversible transition to a molten, rubber-like state. The Tg may be measured using DSC, or calculated using the Fox equation. Application of the Fox equation to estimate the Tg of polymers is well known to one skilled in the art.

In certain embodiments, the latex polymer has a measured Tg, as measured by DSC. Such Tg may be measured at the beginning, mid-point, or end of polymerization. In certain embodiments, however, the latex polymer may have no clearly measurable Tg. Thus, a latex polymer may be referred to as a "gradient Tg polymer," it may not have a clearly measurable Tg using DSC.

In certain embodiments, the latex polymer is a multistage polymer having at least one measured Tg and at least one Fox Tg (which are not alternative representations of the same glass transition). Herein, "Fox Tg" and "calculated Tg" and "calculated Fox Tg" are used interchangeably.

The Tg of a particular stage, or combination of stages, can be estimated (i.e., calculated) using the Fox equation. For example, for a polymer made from two monomers in a particular stage, the theoretical Tg may be calculated using the Fox equation as follows:

$$1/Tg = Wa/Tga + Wb/Tgb$$

wherein:

Tga and Tgb are the respective glass transition temperatures in Kelvin of homopolymers made from monomers "a" and "b"; and Wa and Wb are the respective weight fractions of polymers "a" and "b". When additional monomer feeds "c" and "d" and so on are employed, additional fractions Wc/Tgc, Wd/Tgd and so on are added to the right-hand side of the above equation. Unless indicated otherwise, the "calculated" stage or copolymer Tg's referenced herein are calculated using the Fox equation. Also, the calculation is based on all of the monomers that are reacted together to form a stage, and not upon merely a portion of such monomers.

The value of Tg of the monomers used to estimate the polymer Tg are based on literature values. Typically, there is some variation of the Tg values of the homopolymers of monomers listed in such literature. The difference arises from the test method used to measure the Tg. The differences also arise from influence of comonomers polymerized together. For the purposes of this disclosure, the values used for the homopolymer Tg of certain monomers, particularly monomers used in the examples are listed herein (e.g., in the Materials Table in the Examples Section). Alternatively, the method of determining the Tg of a homopolymer can be determined using the DSC procedure described in the Examples Section, particularly if the literature values are significantly different (e.g., the literature values vary by at least 15° C.). If the literature values vary by less than 15° C., then use the lower literature value.

In certain embodiments, the multistage polymer is a gradient latex polymer (i.e., gradient Tg latex polymer). Typically, a gradient Tg latex polymer will have a DSC (differential scanning calorimetry) curve that exhibits no Tg inflection points, and could be said to have an essentially infinite number of Tg stages. For example, one may start with a high Tg monomer feed and then at a certain point in the polymerization start to feed a low Tg soft stage monomer composition into the high Tg hard stage monomer feed. The resulting multistage latex polymer will have a gradient Tg from high to low. In other embodiments, it may be favorable to feed a high Tg hard stage monomer composition into a low Tg soft stage monomer composition.

In some embodiments, a multistage latex described herein will contain at least 10 wt-%, at least 20 wt-%, or at least 25 wt-%, of high Tg or hard stage monomers. In some embodiments, a multistage latex described herein will include up to 50 wt-%, up to 40 wt-%, or up to 35 wt-%, of high Tg or hard stage monomers. In some embodiments, a multistage latex described herein will include at least 50 wt-%, at least 60 wt-%, or at least 65 wt-%, of low Tg or soft stage monomers. In some embodiments, a multistage latex described herein will include up to 90 wt-%, up to 80 wt-%, or up to 75 wt-%, of low Tg or soft stage monomers.

In certain aspects, a multistage latex described herein preferably includes at least two polymer portions, e.g., a first stage and a second stage, with different Tg values, where the difference in Tg ($\Delta$Tg) is at least 35° C., at least 50° C., or at least 60° C., or at least about 65° C. In certain aspects, the $\Delta$Tg is less than 200° C., less than 150° C., or less than 100° C.

A gradient Tg polymer may also be used in conjunction with multiple Tg polymers. For gradient Tg latex polymers, a Tg differential may be determined by using the Fox equation to calculate the theoretical Tg for a copolymer made from the monomer feed at the start of polymerization and comparing the result to the calculated theoretical Tg for a copolymer made from the second feed. Such gradient Tg can result from the second monomer feed being combined into the first monomer feed to form a gradient architecture, or ultimately result from two monomer feeds being combined at differential rates (e.g., the rate of one monomer feed increases while the rate of a second monomer feed decreases).

In certain embodiments, there may be a discrete measurable Tg of an otherwise gradient Tg latex polymer, such discreet Tg is typically corresponding to the polymer resulting from polymerization of the first monomer feed, or to a mixture of the first monomer feed and a small amount of the second monomer feed.

In certain embodiments, the emulsion latex polymer of the present disclosure has at least one Fox Equation (theoretical calculated) Tg of 10° C. to 45° C. (in certain embodiments, 25° C. to 45° C., or 10° C. to 35° C., and in certain embodiments, the Fox Equation Tg is 35° C.). In certain embodiments, the emulsion latex polymer of the present disclosure has at least one Fox Equation (theoretical calculated) Tg of 45° C. to −10° C. (in certain embodiments, −45° C. to −22° C., and in certain embodiments, the Fox Equation Tg is −32° C., or −22° C.).

In certain embodiments, the emulsion latex polymer of the present disclosure has an acid number of up to 30 (per kg OH). In certain embodiments, the emulsion latex polymer of the present disclosure has an acid number of at least 5 (per kg OH).

In certain embodiments, the emulsion latex polymer of the present disclosure includes latex particles having a volume average particle size of at least 50 nm, or at least 60 nm, or at least 70 nm. In certain embodiments, the emulsion latex polymer of the present disclosure includes latex particles having a volume average particle size of up to 150 nm, or up to 130 nm.

Latex polymers may be made from the described monomers using a variety of techniques known to one skilled in the art. Typically, such polymers are made from an aqueous emulsion that includes one or more monomers as described herein, preferably using a multistage feed process. In certain embodiments, after the latex polymer is formed in water, more water may be added to obtain a desired solids level.

Such multistage feed processes (e.g., powerfeed methods) for producing emulsion copolymers are well-known. They enable one to constantly vary the composition of monomers being polymerized to produce copolymers having a variety (e.g., gradient) of desired properties. For example, in certain embodiments a gradient is achieved by changing the feed rate of a second monomer mixture into a first monomer mixture.

There is no required order of mixing monomers or required combination of monomers. Furthermore, there is no requirements regarding which monomers may be mixed with which monomers. In certain preferred embodiments, however, the one or more monomers of Formula (I) are added in the first stage of a multistage process.

In certain embodiments, the latex polymer is formed from components that also include one or more radical transfer agents (i.e., chain transfer agents), although such agent is not required. In certain embodiments, the radical transfer agents are selected from dodecanethiol, mercaptopropionic acid, isooctyl thioglycolate, butyl mercapto propionate, and combinations thereof. In certain embodiments, the one or more radical transfer agents are present in an amount of at least 0.1 wt-%, based on the total weight of monomers, although typically, no radical transfer agent is needed. If used, in certain embodiments, the one or more radical transfer agents are present in an amount of up to 0.5 wt-%, based on the total weight of monomers.

In certain embodiments, the stain-blocking primer includes at least 10 wt-%, or at least 15 wt-% of a stain-blocking polymer, which is an emulsion latex polymer, based on the total nonvolatile weight of the primer. In certain embodiments, the stain-blocking primer includes up to 50 wt-%, or up to 30 wt-% of a stain-blocking polymer, which is an emulsion latex polymer, based on the total nonvolatile weight of the primer.

The primers of the present disclosure also include an aqueous carrier (e.g., water and one or more optional organic solvents), and optionally, one or more additives selected from a surfactant, thickener, biocide, mildewcide, colorant (e.g., inorganic pigment), and combinations thereof.

In certain embodiments, the stain-blocking primer includes water in an amount of at least 50 wt-%, based on the total weight of the primer. In certain embodiments, the stain-blocking primer includes water in an amount of up to 90 wt-%, based on the total weight of the primer.

In certain embodiments, the primers of the present disclosure include a substantial amount of water and may further include one or more optional organic solvents. Such primers are referred to herein as aqueous coating compositions. In some embodiments, water constitutes greater than 20 wt-%, or greater than 35 wt-%, or greater than 50 wt-%, of the total weight of the aqueous carrier. In some embodiments, water constitutes 100 wt-% or less, less than 95 wt-%, or less than 90 wt-%, of the total weight of the aqueous carrier.

Suitable optional organic solvents include ketones, glycol ethers, esters, alcohols, aromatics, and combinations thereof. Examples of such solvents include carbitol, butyl carbitol, butylcellosolve, propylene glycol monomethyl ether, dibasic ester, ethyl carbitol, diisobutyl ketone, dipropylene glycol n-butyl ether (DPNB), and 2,2,4-trimethyl-1,3-pentanediol monoisobutyrate (available under the tradename TEXANOL), and mixtures thereof.

In certain embodiments, the primer includes one or more additives selected from a surfactant (e.g., fluorinated surfactants, ethylenically unsaturated surfactants), thickener (e.g., to allow the polymer to coat out on a substrate surface), coalescent (e.g., a glycol ether such as EASTMAN EP, EASTMAN DM, EASTMAN DE, EASTMAN DP, EASTMAN DB and EASTMAN PM from Eastman Chemical Co., an ester alcohol such as TEXANOL ester alcohol from Eastman Chemical Co., or a low VOC coalescent compound such as is described in U.S. Pat. No. 6,762,230 B2), biocide, mildewcide, colorant (e.g., inorganic pigment such as $CaCO_3$, $TiO_2$), and mixtures thereof. In certain embodiments, the primer includes one or more additives for wet hide capability (e.g., titanium dioxide particles, opaque polymeric spheres, and kaolin clay platelets). Such additives may be added during polymerization or after polymerization.

In certain embodiments, one or more additives may be present in an amount of at least 0.1 wt-%, at least 0.5 wt-%, or at least 1 wt-%, based on the total weight of polymer solids. In certain embodiments, one or more additives may be present in an amount of up to 5 wt-%, up to 4 wt-%, up to 3 wt-%, up to 2 wt-%, or up to 1 wt-%, based on the total weight of polymer solids.

In certain embodiments, primers of the present disclosure are low VOC primers. By controlling the type of monomers selected for the feed process, a multistage latex suitable for low VOC, primers may be formed. The phrase "low VOC" when used with respect to a primer means that the primer contains less than 10 weight percent (wt-%) volatile organic compounds, more preferably less than 7 wt-% volatile organic compounds, and most preferably less than 4 wt-% volatile organic compounds, based upon the total primer weight. The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in 20 atmospheric photochemical reactions. Typically, volatile organic compounds have a vapor pressure equal to or greater than 0.1 mm Hg. As used herein, "volatile organic compound content" ("VOC content") is as measured by ASTM method D2369-90, refers to the weight of VOC per volume of the coating solids, and is reported, for example, as grams VOC per liter (g/L).

In certain embodiments, the primer is a clear (i.e., unpigmented) primer.

The present disclosure also provides a kit for making a stain-blocking primer. The kit includes an emulsion latex polymer described herein and instructions for forming a stain-blocking primer as described herein. The emulsion latex polymer and the instructions are typically physically packaged together; however, the two do not need to be physically delivered together in a physical package to be a kit.

The present disclosure also provides a method (e.g., a method of blocking stains). The method includes causing a stain-blocking polymer as described herein, which may be in a primer) to be applied to a stained substrate (i.e., a substrate that has a stain or a staining agent therein or thereon). Herein, "causing" means applying the polymer (e.g., in an aqueous primer formulation) to the stained substrate, instructing it to be applied to the stained substrate, supplying it to a user to apply it to a stained substrate, or supplying it to a manufacturer to make a primer for use on a stained substrate.

Typically, the method also includes causing a primer that includes a stain-blocking polymer to be applied to a stained substrate, and drying or allowing the primer to harden to form a hardened stain-blocking coating and block the slain (i.e., form a barrier for the staining agent to show through a topcoat).

The step of applying the aqueous coating composition may be any of a wide variety of coating techniques known to one skilled in the art.

The step of allowing a primer (i.e., aqueous composition) to harden and form a hardened coating may include exposing the primer to a wide variety of conditions known to one skilled in the art. Typically, such conditions include exposing the aqueous composition to a temperature of at least 10° C., and in certain embodiments up to 100° C., for a period of time of at least 60 minutes and up to 168 hours. For example, such conditions may include hardening (e.g., drying or curing) the primer at a temperature of at least 10° C. for at least 168 hours. Alternatively, such conditions may include using a temperature of no more than (i.e., up to) 100° C. for no more than (i.e., up to) 60 minutes. Such hardening may occur in one or more steps.

A coated (e.g., primed) stained substrate including a substrate surface having a hardened coating disposed thereon is provided by the present disclosure. Such coated stained substrate may be prepared by this method.

Exemplary Embodiments

In certain embodiments (embodiment 1), a stain-blocking primer is provided that includes: at least 10 wt-%, based on the total nonvolatile weight of the primer, of an emulsion latex polymer comprising interpolymerized monomers comprising: at least 1 wt-%, based on total weight of monomers, of one or more acrylic acid ester monomers of Formula (I):

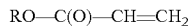

wherein: R is a branched alkyl group having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene; an aqueous carrier; and optionally, one or more additives selected from a surfactant, thickener, coalescent, biocide, mildewcide, colorant (e.g., inorganic pigment), and combinations thereof.

In certain embodiments (embodiment 2), a primer of embodiment 1 is provided wherein R of Formula (I) has no more than 20 carbon atoms, no more than 16 carbon atoms, no more than 12 carbon atoms, no more than 10 carbon atoms, no more than 6 carbon atoms, or no more than 4 carbon atoms. In certain embodiments (embodiment 3), a primer of embodiment 1 or 2), is provided wherein R of Formula (I) is a branched alkyl group having a tertiary carbon atom. In certain embodiments (embodiment 4), a primer of any of the previous embodiments is provided wherein R of Formula (I) is a branched alkyl group of 4 to 10 carbon atoms having a tertiary carbon atom.

In certain embodiments (embodiment 5), a primer of any of the previous embodiments is provided wherein the monomer of Formula (I) has a homopolymer Tg of less than 110° C. or less than 50° C. In certain embodiments (embodiment 6), a primer of any of the previous embodiments is provided wherein the monomer of Formula (I) has a homopolymer Tg of at least 20° C., or at least 30° C.

In certain embodiments (embodiment 7), a primer of any of the previous embodiments is provided wherein the emulsion latex polymer comprises a mixture of monomers of Formula (I).

In certain embodiments (embodiment 8), a primer of any of the previous embodiments is provided wherein the one or more monomers of Formula (I) are selected from isobornyl acrylate, cyclohexyl acrylate, t-butyl acrylate, and a mixture thereof. In certain embodiments (embodiment 9), a primer of embodiment 8 is provided wherein the one or more monomers of Formula (I) comprise t-butyl acrylate.

In certain embodiments (embodiment 10), a primer of any of the previous embodiments is provided wherein the latex polymer has at least one Fox Equation (theoretical calculated) Tg of 10° C. to 45° C. (in certain embodiments, 25° C. to 45° C., or 10° C. to 35° C.). In certain embodiments (embodiment 11), a primer of embodiment 10 is provided wherein the latex polymer has at least one Fox Equation (theoretical calculated) Tg of −45° C. to −10° C. (in certain embodiments, −45° C. to −22° C., −32° C., or −22° C.).

In certain embodiments (embodiment 12), a primer of any of the previous embodiments is provided wherein the latex polymer has an acid number of up to 30 (per kg OH). In certain embodiments (embodiment 13), a primer of any of the previous embodiments is provided wherein the latex polymer has an acid number of at least 5 (per kg OH).

In certain embodiments (embodiment 14), a primer of any of the previous embodiments is provided wherein the latex polymer comprises latex particles having a volume average particle size of at least 50 nm, or at least 60 nm, or at least 70 nm. In certain embodiments (embodiment 15), a primer of any of the previous embodiments is provided wherein the latex polymer comprises latex particles having a volume average particle size of up to 150 nm, or up to 130 nm.

In certain embodiments (embodiment 16), a primer of any of the previous embodiments is provided comprising at least 15 wt-% of the emulsion latex polymer, based on the total nonvolatile weight of the primer. In certain embodiments (embodiment 17), a primer of any of the previous embodiments is provided comprising up to 50 wt-% of the emulsion latex polymer, based on the total nonvolatile weight of the primer. In certain embodiments (embodiment 18), a primer of embodiment 17 is provided comprising up to 30 wt-% of the emulsion latex polymer, based on the total nonvolatile weight of the primer.

In certain embodiments (embodiment 19), a primer of any of the previous embodiments is provided wherein the polymer is a two- or more-stage emulsion latex polymer (e.g., resulting from a power feed process). In certain embodiments (embodiment 20), a primer of embodiment 19 is provided wherein the monomer of Formula (I) is present in a hard stage of the emulsion latex polymer.

In certain embodiments (embodiment 21), a primer of any of the previous embodiments is provided wherein the interpolymerized monomers comprise at least 2 wt-%, or at least 5 wt-%, of one or more monomers of Formula (I), based on the total weight of the interpolymerized monomers. In certain embodiments (embodiment 22), a primer of any of the previous embodiments is provided wherein the interpolymerized monomers comprise less than 20 wt-% (or up to 15 wt-%, or up to 10 wt-%) of one or more monomers of Formula (I), based on the total weight of the interpolymerized monomers.

In certain embodiments (embodiment 23), a primer of any of the previous embodiments is provided wherein the interpolymerized monomers comprise one or more (meth)acrylate monomers selected from n-butyl (meth)acrylate (n-BA and n-BMA), ethylhexyl (meth)acrylate, methyl (meth)acrylate, and combinations thereof. In certain embodiments (embodiment 24), a primer of any of the previous embodiments is provided wherein the interpolymerized monomers comprise at least 10 wt-% (or at least 20 wt-%, at least 30 wt-%, at least 40 wt-%, at least 50 wt-%, at least 60 wt-%, at least 70 wt-%, at least 75 wt-%, at least 80 wt-%, at least 83 wt-%, at least 84 wt-%, at least 85 wt-%, or at least 90 wt-%) of one or more (meth)acrylate monomers (e.g., two or more (meth)acrylate monomers), based on the total weight of the interpolymerized monomers. In certain embodiments (embodiment 25), a primer of any of the previous embodiments is provided wherein the interpolymerized monomers comprise up to 99 wt-% (or up to 98 wt-%, or up to 95 wt-%) of one or more (meth)acrylate monomers (e.g., two or more (meth)acrylate monomers), based on the total weight of the interpolymerized monomers. In certain embodiments, if the interpolymerized monomers of the emulsion latex polymer include n-butyl methacrylate (n-BMA), it is present in an amount of no more than 12 wt-%, based on the total weight of the interpolymerized monomers.

In certain embodiments (embodiment 26), a primer of any of the previous embodiments is provided wherein the interpolymerized monomers comprise styrene. In certain embodiments (embodiment 27), a primer of any of the previous embodiments is provided wherein the interpolymerized monomers comprise at least 1 wt-% (or at least 5 wt-%, at least 10 wt-%, or at least 15 wt-%) styrene, based on the total weight of the interpolymerized monomers. In certain embodiments (embodiment 28), a primer of any of the previous embodiments is provided wherein the interpolymerized monomers comprise up to 75 wt-% (or up to 50 wt-%) styrene, based on the total weight of the interpolymerized monomers.

In certain embodiments (embodiment 29), a primer of any of the previous embodiments is provided wherein the interpolymerized monomers comprise one or more wet adhesion monomers (e.g., those selected from N-(2-methacryloyloxy-ethyl) ethylene urea, 1-(2-((3-(allyloxy)-2-hydroxyproypl) amino)ethyl)imidazolidine-2-one, and combinations thereof). In certain embodiments (embodiment 30), a primer of embodiment 29 is provided wherein the interpolymerized monomers comprise at least 0.2 wt-% of one or more wet adhesion monomers, based on the total weight of the interpolymerized monomers. In certain embodiments (embodiment 31), a primer of embodiment 29 or 30 is provided wherein the interpolymerized monomers comprise up to 2.0 wt-% (or up to 1.0 wt-%) of one or more wet adhesion monomers, based on the total weight of the interpolymerized monomers.

In certain embodiments (embodiment 32), a primer of any of the previous embodiments is provided which is a clear (i.e., unpigmented) primer.

In certain embodiments (embodiment 33), a primer of any of the previous embodiments is provided further comprising one or more additives selected from a surfactant, thickener, coalescent, biocide, mildewcide, colorant (e.g., inorganic pigment), and mixtures thereof. In certain embodiments (embodiment 34), a primer of embodiment 33 is provided comprising an inorganic pigment (e.g., $CaCO_3$, $TiO_2$). In certain embodiments (embodiment 35), a primer of embodiment 33 or 34 is provided comprising a thickener (e.g., to allow the polymer to coat out on a substrate surface). In certain embodiments (embodiment 36), a primer of any of the previous embodiments is provided comprising one or more additives for wet hide capability (e.g., titanium dioxide particles, opaque polymeric spheres, and kaolin clay platelets).

In certain embodiments (embodiment 37), a primer of any of the previous embodiments is provided having a viscosity of 60-120 units measured by Krebs Viscometer at room temperature (suitable for spray, roll, or brush).

In certain embodiments (embodiment 38), a primer of any of the previous embodiments is provided wherein a hardened coating formed from the primer has a stain-blocking performance, based on the Stain-blocking Test, characterized by a ΔE value of: at most 20, preferably at most 18, for a black water-washable marker; at most 16 for a blue water-washable marker; and/or at most 15, preferably at most 12 for a green water-washable marker. In certain embodiments, such as in single-stage latex polymers, the ΔE value is: at most 14 for black water-washable marker; at most 7 for a blue water-washable marker; and/or at most 8 for a green water-washable marker. In certain embodiments (embodiment 39), a primer of any of the previous embodiments is provided wherein a hardened coating formed from the primer has an adhesion performance of at least 2 based on the ASTM 3359 Cross-cut Adhesion Test. In certain embodiments (embodiment 40), a primer of any of the previous embodiments is provided wherein a hardened coating formed from the primer has a pendulum hardness of at least 4 based on the König Pendulum Hardness Test.

In certain embodiments (embodiment 41), a primer of any of the previous embodiments is provided which is a low VOC primer (i.e., contains less than 10 wt-% volatile organic compounds, based on the total weight of the primer).

In certain embodiments (embodiment 42), a primer of embodiment 41 is provided which includes less than 7 wt-%, or less than 4 wt-%, volatile organic compounds, based on the total weight of the primer).

In certain embodiments (embodiment 43), a stain-blocking polymer is provided that includes: an emulsion latex polymer comprising interpolymerized monomers comprising: at least 1 wt-% of one or more acrylic acid ester monomers of Formula (I):

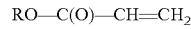

wherein: R is a branched alkyl having a tertiary carbon atom; at least 10 wt-% of one or more (meth)acrylate monomers selected from n-butyl (meth)acrylate, ethylhexyl (meth) acrylate, methyl (meth)acrylate, and combinations thereof; and at least 1 wt-% styrene; wherein the weight percentages are based on the total weight of the interpolymerized monomers; wherein a hardened coating formed from the stain-blocking polymer has one or more of the following properties: a stain-blocking performance, based on the Stain-blocking Test, characterized by a ΔE value of: at most 20, preferably at most 18, for a black water-washable marker; at most 16 for a blue water-washable marker (or in certain embodiments, such as in single-stage latex polymers, the ΔE value is: at most 14 for black water-washable marker; at most 7 for a blue water-washable marker; and/or at most 8 for a green water-washable marker); at most 15, preferably at most 12, for a green water-washable marker; an adhesion performance of at least 2 based on the ASTM 3359 Cross-cut Adhesion Test; and a pendulum hardness of at least 4 based on the König Pendulum Hardness Test.

In certain embodiments (embodiment 44), a stain-blocking polymer of embodiment 43 is provided wherein R of Formula (I) has no more than 20 carbon atoms, no more than 16 carbon atoms, no more than 12 carbon atoms, no more than 10 carbon atoms, no more than 6 carbon atoms, or no more than 4 carbon atoms. In certain embodiments (embodiment 45), a stain-blocking polymer of embodiment 43 or 44 is provided wherein R of Formula (I) is a branched alkyl group having a tertiary carbon atom. In certain embodiments (embodiment 46), a stain-blocking polymer of embodiments 43 through 45 is provided wherein R of Formula (I) is a branched alkyl group of 4 to 10 carbon atoms having a tertiary carbon atom. In certain embodiments (embodiment 47), a stain-blocking polymer of embodiments 43 through 46 is provided wherein the monomer of Formula (I) has a homopolymer Tg of less than 110° C., or less than 50° C. In certain embodiments (embodiment 48), a stain-blocking polymer of embodiments 43 through 47 is provided wherein the monomer of Formula (I) has a homopolymer Tg of at least 20° C., or at least 30° C.

In certain embodiments (embodiment 49), a stain-blocking polymer of embodiments 43 through 48 is provided wherein the emulsion latex polymer comprises a mixture of monomers of Formula (I).

In certain embodiments (embodiment 50), a stain-blocking polymer of embodiments 43 through 49 is provided wherein the one or more monomers of Formula (I) are selected from isobornyl acrylate, cyclohexyl acrylate, t-butyl acrylate, and a mixture thereof. In certain embodiments (embodiment 51), a stain-blocking polymer of embodiment 50 is provided wherein the one or more monomers of Formula (I) comprise t-butyl acrylate.

In certain embodiments (embodiment 52), a stain-blocking polymer of embodiments 43 through 51 is provided wherein the latex polymer has at least one Fox Equation (theoretical calculated) Tg of 10° C. to 45° C. (in certain embodiments, 25° C. to 45° C., or 10° C. to 35° C.). In certain embodiments (embodiment 53), a stain-blocking polymer of embodiment 52 is provided wherein the latex polymer has at least one Fox Equation (theoretical calculated) Tg of −45° C. to −10° C. (in certain embodiments, −45° C. to −22° C., −32° C., or −22° C.).

In certain embodiments (embodiment 54), a stain-blocking polymer of embodiments 43 through 53 is provided wherein the latex polymer has an acid number of up to 30 (per kg OH). In certain embodiments (embodiment 55), a stain-blocking polymer of embodiments 43 through 54 is provided wherein the latex polymer has an acid number of at least 5 (per kg OH).

In certain embodiments (embodiment 56), a stain-blocking polymer of embodiments 43 through 55 is provided wherein the latex polymer comprises latex particles having a volume average particle size of at least 50 nm, or at least 60 nm, or at least 70 nm. In certain embodiments (embodiment 57), a stain-blocking polymer of embodiments 43 through 56 is provided wherein the latex polymer comprises latex particles having a volume average particle size of up to 150 nm, or up to 130 nm.

In certain embodiments (embodiment 58), a stain-blocking polymer of embodiments 43 through 57 is provided wherein the polymer is a two- or more-stage emulsion latex polymer (e.g., resulting from a power feed process). In certain embodiments (embodiment 59), a stain-blocking polymer of embodiment 58 is provided wherein the monomer of Formula (I) is present in a hard stage of the emulsion latex polymer.

In certain embodiments (embodiment 60), a stain-blocking polymer of embodiments 43 through 59 is provided wherein the interpolymerized monomers comprise at least 2 wt-%, or at least 5 wt-%, of one or more monomers of Formula (I), based on the total weight of the interpolymerized monomers. In certain embodiments (embodiment 61), a stain-blocking polymer of embodiments 43 through 60 is provided wherein the interpolymerized monomers comprise less than 20 wt-% (or up to 15 wt-%, or up to 10 wt-%) of one or more monomers of Formula (I), based on the total weight of the interpolymerized monomers.

In certain embodiments (embodiment 62), a stain-blocking polymer of embodiments 43 through 61 is provided wherein the interpolymerized monomers comprise at least 75 wt-% (or least 80 wt-%, at least 83 wt-%, at least 84 wt-%, at least 85 wt-%, or at least 90 wt-%) of one or more (meth)acrylate monomers (e.g., two or more (meth)acrylate monomers), based on the total weight of the interpolymerized monomers. In certain embodiments (embodiment 63), a stain-blocking polymer of embodiments 43 through 62 is provided wherein the interpolymerized monomers comprise up to 99 wt-% (or up to 98 wt-%, or up to 95 wt-%) of one or more (meth)acrylate monomers (e.g., two or more (meth) acrylate monomers), based on the total weight of the interpolymerized monomers. In certain embodiments, if the interpolymerized monomers of the emulsion latex polymer include n-butyl methacrylate (n-BMA), it is present in an amount of no more than 12 wt-%, based on the total weight of the interpolymerized monomers.

In certain embodiments (embodiment 64), a stain-blocking polymer of embodiments 43 through 63 is provided wherein the interpolymerized monomers comprise at least 5 wt-% (or at least 10 wt-%, or at least 15 wt-%) styrene, based on the total weight of the interpolymerized monomers. In certain embodiments (embodiment 65), a stain-blocking polymer of embodiments 43 through 64 is provided wherein the interpolymerized monomers comprise up to 75 wt-% (or up to 50 wt-%) styrene, based on the total weight of the interpolymerized monomers.

In certain embodiments (embodiment 66), a stain-blocking polymer of embodiments 43 through 65 is provided wherein the interpolymerized monomers comprise one or more wet adhesion monomers (e.g., those selected from N-(2-methacryloyloxyethyl) ethylene urea, 1-(2-((3-(allyloxy)-2-hydroxyproypl)amino)ethyl)imidazolidine-2-one, and combinations thereof).

In certain embodiments (embodiment 67), a stain-blocking polymer of embodiments 43 through 66 is provided wherein the interpolymerized monomers comprise at least 0.2 wt-% of one or more wet adhesion monomers, based on the total weight of the interpolymerized monomers. In certain embodiments (embodiment 68), a stain-blocking polymer of embodiment 66 or 67 is provided wherein the interpolymerized monomers comprise up to 2.0 wt-% (or up to 1.0 wt-%) of one or more wet adhesion monomers, based on the total weight of the interpolymerized monomers.

In certain embodiments (embodiment 69), a stained substrate is provided having a stain-blocking primer of any of embodiments 1 through 42 coated thereon or a stain-blocking polymer of any of embodiments 43 through 68 coated thereon.

In certain embodiments (embodiment 70), a stained substrate is provided having a stain-blocking polymer coated thereon, wherein the stain-blocking polymer is an emulsion latex polymer comprising interpolymerized monomers comprising: at least 1 wt-%, based on the total weight of the interpolymerized monomers, of one or more acrylic acid ester monomers of Formula (I):

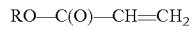

wherein: R is a branched alkyl having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene.

In certain embodiments (embodiment 71), a stained substrate of embodiment 70 is provided wherein R of Formula (I) has no more than 20 carbon atoms, no more than 16 carbon atoms, no more than 12 carbon atoms, no more than 10 carbon atoms, no more than 6 carbon atoms, or no more than 4 carbon atoms. In certain embodiments (embodiment 72), a stained substrate of embodiment 70 or 71 is provided wherein R of Formula (I) is a branched alkyl group having a tertiary carbon atom. In certain embodiments (embodiment 73), a stained substrate of embodiments 70 through 72 is provided wherein R of Formula (I) is a branched alkyl group of 4 to 10 carbon atoms having a tertiary carbon atom.

In certain embodiments (embodiment 74), a stained substrate of embodiments 70 through 73 is provided wherein the monomer of Formula (I) has a homopolymer Tg of less than 110° C., or less than 50° C. In certain embodiments (embodiment 75), a stained substrate of embodiments 70 through 74 is provided wherein the monomer of Formula (I) has a homopolymer Tg of at least 20° C. or at least 30° C.

In certain embodiments (embodiment 76), a stained substrate of embodiments 70 through 75 is provided wherein the emulsion latex polymer comprises a mixture of monomers of Formula (I).

In certain embodiments (embodiment 77), a stained substrate of embodiments 70 through 76 is provided wherein the one or more monomers of Formula (I) are selected from isobornyl acrylate, cyclohexyl acrylate, t-butyl acrylate, and a mixture thereof. In certain embodiments (embodiment 78), a stained substrate of embodiment 77 is provided wherein the one or more monomers of Formula (I) comprise t-butyl acrylate.

In certain embodiments (embodiment 79), a stained substrate of embodiments 70 through 78 is provided wherein the latex polymer has at least one Fox Equation (theoretical calculated) Tg of Tg of 10° C. to 45° C. (in certain embodiments, 25° C. to 45° C., or 10° C. to 35° C.). In certain embodiments (embodiment 80), a stained substrate of embodiment 79 is provided wherein the latex polymer has at least one Fox Equation (theoretical calculated) Tg of 45° C. to −10° C. (in certain embodiments, −45° C. to −22° C., −32° C., or −22° C.).

In certain embodiments (embodiment 81), a stained substrate of embodiments 70 through 80 is provided wherein the latex polymer has an acid number of up to 30 (per kg OH). In certain embodiments (embodiment 82), a stained substrate of embodiments 70 through 81 is provided wherein the latex polymer has an acid number of at least 5 (per kg OH).

In certain embodiments (embodiment 83), a stained substrate of embodiments 70 through 82 is provided wherein the latex polymer comprises latex particles having a volume average particle size of at least 50 nm, or at least 60 nm, or at least 70 nm. In certain embodiments (embodiment 84), a stained substrate of embodiments 70 through 83 is provided wherein the latex polymer comprises latex particles having a volume average particle size of up to 150 nm, or up to 130 nm.

In certain embodiments (embodiment 85), a stained substrate of embodiments 70 through 84 is provided wherein the polymer is a two- or more-stage emulsion latex polymer (e.g., resulting from a power feed process). In certain embodiments (embodiment 86), a stained substrate of embodiment 85 is provided wherein the monomer of Formula (I) is present in a hard stage of the emulsion latex polymer.

In certain embodiments (embodiment 86), a stained substrate of embodiments 70 through 85 is provided wherein the interpolymerized monomers comprise at least 2 wt-% (or at least 5 wt-%) of one or more monomers of Formula (I), based on the total weight of the interpolymerized monomers. In certain embodiments (embodiment 87), a stained substrate of embodiments 70 through 86 is provided wherein the interpolymerized monomers comprise less than 20 wt-% (or up to 15 wt-%, or up to 10 wt-%) of one or more monomers of Formula (I), based on the total weight of the interpolymerized monomers.

In certain embodiments (embodiment 88), a stained substrate of embodiments 70 through 87 is provided wherein the interpolymerized monomers comprise one or more (meth)acrylate monomers selected from n-butyl (meth)acrylate, ethylhexyl (meth)acrylate, methyl (meth)acrylate, and combinations thereof. In certain embodiments (embodiment 89), a stained substrate of embodiments 70 through 88 is provided wherein the interpolymerized monomers comprise at least 10 wt-% (or at least 20 wt-%, at least 30 wt-%, at least 40 wt-%, at least 50 wt-%, at least 60 wt-%, at least 70 wt-%, at least 75 wt-%, at least 80 wt-%, at least 83 wt-%, at least 84 wt-%, at least 85 wt-%, or at least 90 wt-%) of one or more (meth)acrylate monomers, based on the total weight of the interpolymerized monomers. In certain embodiments (embodiment 90), a stained substrate of embodiments 70 through 89 is provided wherein the interpolymerized monomers comprise up to up to 99 wt-% (or up to 98 wt-%, or up to 95 wt-%) of one or more (meth)acrylate monomers, based on the total weight of the interpolymerized monomers.

In certain embodiments (embodiment 91), a stained substrate of embodiments 70 through 90 is provided wherein the interpolymerized monomers comprise styrene. In certain embodiments (embodiment 92), a stained substrate of embodiments 70 through 91 is provided wherein the interpolymerized monomers comprise at least 1 wt-% (or at least 5 wt-%, at least 10 wt-%, or at least 15 wt-%) styrene, based on the total weight of the interpolymerized monomers. In certain embodiments (embodiment 93), a stained substrate of embodiments 70 through 92 is provided wherein the interpolymerized monomers comprise up to 75 wt-% (or up to 50 wt-%) styrene, based on the total weight of the interpolymerized monomers.

In certain embodiments (embodiment 94), a stained substrate of embodiments 70 through 93 is provided wherein the interpolymerized monomers comprise one or more wet adhesion monomers (e.g., those selected from N-(2-methacryloyloxyethyl) ethylene urea, 1-(2-((3-(allyloxy)-2-hydroxyproypl)amino)ethyl)imidazolidine-2-one, and combinations thereof).

In certain embodiments (embodiment 95), a stained substrate of embodiments 70 through 94 is provided wherein the interpolymerized monomers comprise at least 0.2 wt-% of one or more wet adhesion monomers, based on the total weight of the interpolymerized monomers. In certain embodiments (embodiment 96), a stained substrate of embodiments 70 through 95 is provided wherein the interpolymerized monomers comprise up to 2.0 wt-% (or up to 1.0 wt-%) of one or more wet adhesion monomers, based on the total weight of the interpolymerized monomers.

In certain embodiments (embodiment 97), a stained substrate of embodiments 70 through 96 is provided wherein a hardened coating formed from the stain-blocking polymer has a stain blocking performance, based on the Stain-blocking Test, characterized by a ΔE value of: at most 20, preferably at most 18, for a black water-washable marker; at most 16 for a blue water-washable marker; and/or at most 15, preferably at most 12, for a green water-washable marker (or in certain embodiments, such as in single-stage latex polymers, the ΔE value is: at most 14 for black water-washable marker; at most 7 for a blue water-washable marker; and/or at most 8 for a green water-washable marker). In certain embodiments (embodiment 98), a stained substrate of embodiments 70 through 97 is provided wherein a hardened coating formed from the stain-blocking polymer has an adhesion performance of at least 2 based on the ASTM 3359 Cross-cut Adhesion Test. In certain embodiments (embodiment 99), a stained substrate of embodiments 70 through 98 is provided wherein a hardened coating formed from the stain-blocking polymer has a pendulum hardness of at least 4 based on the König Pendulum Hardness Test.

In certain embodiments (embodiment 100), a kit for making a stain-blocking primer (e.g., of embodiments 1 through 42) is provided that includes: an emulsion latex polymer comprising interpolymerized monomers comprising: at least 1 wt-%, based on the total weight of the interpolymerized monomers, of one or more acrylic acid ester monomers of Formula (I):

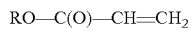
RO—C(O)—CH=CH$_2$ wherein: R is a branched alkyl having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene; and instructions for forming a stain-blocking primer.

In certain embodiments (embodiment 101), a kit for making a stain-blocking primer of embodiment 100 is provided wherein a hardened coating formed from the primer has a stain-blocking performance, based on the Stainblocking Test, characterized by a ΔE value of: at most 20, preferably at most 18, for a black water-washable marker; at most 16 for a blue water-washable marker; and/or at most 15, preferably at most 12, for a green water-washable marker (or in certain embodiments, such as in single-stage latex polymers, the ΔE value is: at most 14 for black water-washable marker; at most 7 for a blue water-washable marker; and/or at most 8 for a green water-washable marker).

In certain embodiments (embodiment 102), a kit for making a stain-blocking primer of embodiment 100 or 101 is provided wherein the emulsion latex polymer and the instructions are physically packaged together (but the two don't need to be physically delivered together in a physical package to be a kit).

In certain embodiments (embodiment 103), a method is provided that includes: causing a stain-blocking polymer (e.g., of embodiments 43 through 68) to be applied to a stained substrate.

In certain embodiments, (embodiment 104), a method is provided that includes: causing a stain-blocking polymer to be applied to a stained substrate wherein the stain-blocking polymer is an emulsion latex polymer comprising interpolymerized monomers comprising: at least 1 wt-%, based on the total weight of the interpolymerized monomers, of one or more acrylic acid ester monomers of Formula (I):

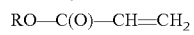
RO—C(O)—CH=CH$_2$ wherein: R is a branched alkyl having a tertiary carbon atom, a cycloaliphatic group, or a combination thereof; optionally, one or more (meth)acrylate monomers selected from n-butyl (meth)acrylate, ethylhexyl (meth)acrylate, methyl (meth)acrylate, and combinations thereof; optionally, one or more wet adhesion monomers; and optionally, styrene.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods. The following abbreviations may be used in the following examples: ppm=parts per million; phr=parts per hundred rubber; mL=milliliter; L=liter; m=meter, mm=millimeter, cm=centimeter, kg=kilogram, g=gram, min=minute, s=second, hrs=hour, ° C.=degrees Celsius, ° F.=degrees Fahrenheit, MPa=megapascals, and N-m=Newton-meter, Mn=number average molecular weight, cP=centipoise.

Theoretical Fox Tg Calculation

The Glass Transition Temperature (Tg) of the disclosed polymer composition is predicted from the Fox Equation, a generalized form of which is shown below:

$$Tg = \left( \frac{W_A}{Tg_A} + \frac{W_B}{Tg_B} + \frac{W_C}{Tg_C} + \ldots + \frac{W_N}{Tg_N} \right)^{-1},$$

where $W_A$, $W_B$, $W_C$, . . . , $W_N$ respectively represent the weight fraction of each monomer type A, B, N in the copolymer composition, and $Tg_A$, $Tg_B$, $Tg_C$, . . . , $Tg_N$ represent the corresponding Tg's (expressed in Kelvin) of the homopolymers prepared from the respective monomer type A, B, C, . . . , N. For example, a polymer composition consisting of 55.8 wt-% styrene (Tg, styrene=373.15K), 42.8 wt-% 2-ethylhexyl acrylate (Tg, 2-EHA=193.15 K), and 1.4 wt-% methacrylic acid (Tg, MAA=458.15) will have a predicted Fox Tg of $$Tg = \left[\frac{0.558}{373.15\ K} + \frac{0.428}{193.15\ K} + \frac{0.014}{458.15\ K}\right]^{-1} = 267.25\ K,$$

or equivalently, −5.9° C.

The Fox equation is also known to adequately predict the effective overall Tg of a miscible polymer mixture. In the case of a multi-stage polymer blend, the overall Tg of the polymer blend can be determined by applying the Tg and weight fraction of each polymer stage in the Fox equation.

Actual Tg

The actual Tg of a polymer or polymer blend can determined experimentally by techniques such as differential scanning calorimetry (DSC) and dynamic mechanical analysis (DMA). All actual Tg disclosed in the current disclosure are evaluated using a DSC25 differential scanning calorimeter equipped with a RSC90 cooler, both purchased from TA Instruments. Calibration was performed on an indium standard and all experiments use a standardized heat-cool-heat cycle at a 20° C./min ramp rate.

Latex Examples

Various latex samples were prepared and the properties of the samples were tested using a Stainblocking Test, Adhesion Test, and König Pendulum Hardness Test.

All latex examples were synthesized under starved fed condition to reduce chances of block copolymerization. Various branched meth(acrylates) with and without at least one tertiary carbon in their ester side chain are substituted in a common latex formula. Some of resulting latexes surprisingly produce coatings that demonstrate noticeably improved stainblocking compared to that of the comparative example latex. To attempt to account for the dependence of polymer Tg on the composition of the monomers, the theoretical Fox Tg of the example latexes are adjusted to the same value within ±1° C.

Latex Preparation Procedure A—Two-Stage Latex

To a 3-liter (3-L) reactor, a 30±5 nm, 30 wt-% seed latex (182 grams (g)) and deionized water (459 g) were added. The reactor was fitted with a four-blade impeller, a condenser, and an internal temperature probe. The reactor assembly was heated to an internal temperature of 58-60° C. with constant agitation maintained throughout the synthetic process. In a separate 0.8 L container, monomer emulsion 1 was prepared by sequentially adding deionized water (113 g), DISPONIL FES 32 (16.5 g), SIPOMER PAM-4000 (5 g), VISIOMER MEEU 25M (6.8 g), methacrylic acid (4.3 g), 28% ammonium hydroxide (2.3 g), dodecyl mercaptan (0.3 g), and a mixture of monomers (TABLE 1) under constant mixing with a three-blade impeller. In a separate 1.8 L container, monomer emulsion 2 was prepared by sequentially adding deionized water (201 g), DISPONIL FES 32 (33 g), SIPOMER PAM-4000 (9.8 g), VISIOMER MEEU 25M (13.6 g), methacrylic acid (8 g), 28% ammonium hydroxide (4.6 g), dodecyl mercaptan (0.7 g), 2-ethylhexyl acrylate (2-EHA) (313 g), and styrene (261 g) under constant mixing with a three-blade agitator. Prior to addition of monomer emulsion 1 to reactor, 70% aqueous tert-butyl hydroperoxide (0.7 g), erythorbic acid (0.5 g), and 7% aqueous DISSOLVINE E-FE-13 (0.2 g) were added to the reactor. Monomer emulsion 1 was fed into the reactor over 1.5 hours (hr). Upon initiation of monomer emulsion 1 feed, an oxidizer solution containing 70% aqueous tert-butyl hydroperoxide (4.3 g) in deionized water (90 g) and a reducer solution containing erythorbic acid (2.6 g) in deionized water (90 g) were fed separately and simultaneously into the reactor over 5.5 hr. Upon depletion of monomer emulsion 1, monomer emulsion 2 was fed into the reactor over 2.5 hr. At the end of monomer emulsion 2 feed, 70% aqueous tert-butyl hydroperoxide (0.7 g) and erythorbic acid (0.5 g) were respectively added to the remaining oxidizer and reducer feed solutions. At the end of oxidizer and reducer feeds, the reactor solution was cooled to below 40° C. and neutralized with 28% ammonium hydroxide (7.4 g). The resulting emulsion was diluted with deionized water (50 g) and filtered through a 100 μm filter.

TABLE 1

| | Components. | | | |
|---|---|---|---|---|
| | Monomer Mixture (g) | | | |
| Example Number | 2-EHA | Styrene | (Meth)acrylic Acid Ester Monomer | |
| Example 1 | 70 | 227 | tBA | 10 |
| Example 2 | 68 | 219 | tBA | 20 |
| Example 3 | 63 | 195 | tBA | 50 |
| Examples 4 and 10 | 53 | 154 | tBA | 100 |
| Example 5 (Comparative) | 34 | 73 | tBA | 200 |
| Example 6 (Comparative) | 17 | 0 | tBA | 291 |
| Example 11 | 70 | 137 | i-BnA | 100 |
| Example 12 | 42 | 165 | CHA | 100 |
| Example 13 (Comparative) | 19 | 189 | i-BuA | 100 |
| Example 14 (Comparative) | 77 | 131 | tBMA | 100 |
| Example 15 (Comparative) | 72 | 235 | — | — |

Latex Preparation Procedure B—Two-Stage Latex

To a 3-L reactor, a 30±5 nm, 30 wt-% seed latex (182 g) and deionized water (459 g) were added. The reactor was fitted with a four-blade impeller, a condenser, and an internal temperature probe. The reactor assembly was heated to an internal temperature of 58-60° C. with constant agitation maintained throughout the synthetic process. In a separate 0.8 L container, monomer emulsion 1 was prepared by sequentially adding deionized water (113 g), DISPONIL FES 32 (16.5 g), SIPOMER PAM-4000 (5 g), VISIOMER MEEU 25M (6.8 g), methacrylic acid (4.3 g), 28% ammonium hydroxide (2.3 g), dodecyl mercaptan (0.3 g), 2-ethylhexyl acrylate (17 g), and tert-butyl acrylate (291 g) under constant mixing with a three-blade impeller. In a separate 1.8 L container, monomer emulsion 2 was prepared by sequentially adding deionized water (201 g), DISPONIL FES 32 (33 g), SIPOMER PAM-4000 (9.8 g), VISIOMER MEEU 25M (13.6 g), methacrylic acid (8 g), 28% ammonium hydroxide (4.6 g), dodecyl mercaptan (0.7 g), and a mixture of monomers (Table 2) under constant mixing with a three-blade agitator. Prior to addition of monomer emulsion 1 to reactor, 70% aqueous tert-butyl hydroperoxide (0.7 g), erythorbic acid (0.5 g), and 7% aqueous DISSOLVINE E-FE-13 (0.2 g) were added to the reactor. Monomer emulsion 1 was fed into the reactor over 1.5 hr. Upon initiation of monomer emulsion 1 feed, an oxidizer solution containing 70% aqueous tert-butyl hydroperoxide (4.3 g) in deionized water (90 g) and a reducer solution containing erythorbic acid (2.6 g) in deionized water (90 g) were fed separately and simultaneously into the reactor over 5.5 hr. Upon depletion of monomer emulsion 1, monomer emulsion 2 was fed into the reactor over 2.5 hr. At the end of monomer emulsion 2 feed, 70% aqueous tert-butyl hydroperoxide (0.7 g) and erythorbic acid (0.5 g) were respectively added to the remaining oxidizer and reducer feed solutions. At the end of oxidizer and reducer feeds, the reactor solution was cooled to below 40° C. and neutralized with 28% ammonium hydroxide (7.4 g). The resulting emulsion was diluted with deionized water (50 g) and filtered through a 100 micrometers (µm) filter.

TABLE 2

Components.

| | Monomer Mixture (g) | | | |
|---|---|---|---|---|
| Example Number | 2-EHA | Styrene | Acrylic Acid Ester Monomer | |
| Example 7 (Comparative) | 293 | 176 | tBA | 105 |
| Example 8 (Comparative) | 274 | 95 | tBA | 205 |
| Example 9 (Comparative) | 252 | 0 | tBA | 322 |

Latex Preparation Procedure C—Powerfeed Latex

To a 3-L reactor, a 30±5 nanometer (nm), 30 wt-% seed latex (182 g) and deionized water (459 g) were added. The reactor was fitted with a four-blade impeller, a condenser, and an internal temperature probe. The reactor assembly was heated to an internal temperature of 58-60° C. with constant agitation maintained throughout the synthetic process. In a separate 0.8 L container, monomer emulsion 1 was prepared by sequentially adding deionized water (113 g), DISPONIL FES 32 (16.5 g), SIPOMER PAM-4000 (5 g), VISIOMER MEEU 25M (6.8 g), methacrylic acid (4.3 g), 28% ammonium hydroxide (2.3 g), dodecyl mercaptan (0.3 g), 2-ethylhexyl acrylate (53.3 g), styrene (154.4 g), and tert-butyl acrylate (100 g) under constant mixing with a three-blade impeller. In a separate 1.8 L container, Monomer Emulsion 2 was prepared by sequentially adding deionized water (201 g), DISPONIL FES 32 (33 g), SIPOMER PAM-4000 (9.8 g), VISIOMER MEEU 25M (13.6 g), methacrylic acid (8 g), 28% ammonium hydroxide (4.6 g), dodecyl mercaptan (0.7 g), 2-ethylhexyl acrylate (313 g), and styrene (261 g) under constant mixing with a three-blade agitator. Prior to addition of the monomer emulsion mixture to reactor, 70% aqueous tert-butyl hydroperoxide (0.7 g), erythorbic acid (0.5 g), and 7% aqueous DISSOLVINE E-FE-13 (0.2 g) were added to the reactor. Monomer emulsion 2 was set to feed over 3.5 hr into Monomer Emulsion 1 container under agitation, while the Monomer Emulsions mixture was simultaneous fed into the reactor over 4 hr. Upon initiation of monomer feed, an oxidizer solution containing 70% aqueous tert-butyl hydroperoxide (4.3 g) in deionized water (90 g) and a reducer solution containing erythorbic acid (2.6 g) in deionized water (90 g) were fed separately and simultaneously into the reactor over 5.5 hr. At the end of monomer feed, 70% aqueous tert-butyl hydroperoxide (0.7 g) and erythorbic acid (0.5 g) were respectively added to the remaining oxidizer and reducer feed solutions. At the end of oxidizer and reducer feeds, the reactor solution was cooled to below 40° C. and neutralized with 28% ammonium hydroxide (7.4 g). The resulting emulsion was diluted with deionized water (50 g) and filtered through a 100 µm filter.

Latex Preparation Procedure D—Single-Stage Latex

To a 3-liter (3-L) reactor, a 30±5 nm, 30 wt-% seed latex (182 grams (g)) and deionized water (450 g) were added. The reactor was fitted with a four-blade impeller, a condenser, and an internal temperature probe. The reactor assembly was heated to an internal temperature of 58-60° C. with constant agitation maintained throughout the synthetic process. In a separate 0.8 L container, monomer emulsion was prepared by sequentially adding deionized water (340 g), DISPONIL FES 32 (49.5 g), SIPOMER PAM-4000 (14.8 g), VISIOMER MEEU 25M (20.4 g), methacrylic acid (12.2 g), 28% ammonium hydroxide (7.5 g), and a mixture of monomers (TABLE 3) under constant mixing with a three-blade impeller. Prior to addition of monomer emulsion to reactor, 70% aqueous tert-butyl hydroperoxide (0.7 g), erythorbic acid (0.5 g), and 7% aqueous DISSOLVINE E-FE-13 (0.2 g) were added to the reactor. Monomer emulsion was fed into the reactor over 3 hours (hr). Upon initiation of monomer emulsion feed, an oxidizer solution containing 70% aqueous tert-butyl hydroperoxide (4.3 g) in deionized water (90 g) and a reducer solution containing erythorbic acid (2.6 g) in deionized water (90 g) were fed separately and simultaneously into the reactor over 4.5 hr. At the end of monomer emulsion feed, 70% aqueous tert-butyl hydroperoxide (0.7 g) and erythorbic acid (0.5 g) were respectively added to the remaining oxidizer and reducer feed solutions. At the end of oxidizer and reducer feeds, the reactor solution was cooled to below 40° C. and neutralized with 28% ammonium hydroxide (5.4 g). The resulting emulsion was diluted with deionized water (50 g) and filtered through a 100 µm filter.

TABLE 3

Components.

| | Monomer Mixture (g) | | | |
|---|---|---|---|---|
| Example Number | 2-EHA | Styrene | (Meth)acrylic Acid Ester Monomer | |
| Example 16 | 378 | 456 | tBA | 49 |
| Example 17 | 368 | 415 | tBA | 100 |
| Example 18 (Comparative) | 387 | 496 | — | — |

Materials

| Material Name | Ingredient of Property (Function) | Source |
|---|---|---|
| DI Water | De-ionized water (Continuous Phase) | MilliporeSigma in Burlington, MA |
| Seed Latex | A styrene acrylate polymer with a solids content of 30 wt-% and particle size of 35 nm made by emulsion polymerization with an anionic surfactant (Seed Polymer) | |
| DISPONIL FES 32 | Fatty alcohol ether sulphate, sodium salt (Emulsifier/Surfactant) | BASF Corporation in Florham Park, NJ |

TABLE 3-continued

| Components. | | |
|---|---|---|
| Methacrylic Acid | $T_g$ = 185° C. (Monomer) | MilliporeSigma |
| Styrene | $T_g$ = 100° C. (Monomer) | MilliporeSigma |
| t-Butyl Acrylate ("tBA") | $T_g$ = 44° C. (Monomer) | BASF Corporation |
| t-Butyl Methacryalte ("tBMA") | $T_g$ = 117° C. (Monomer) | BASF Corporation |
| 2-Ethylhexyl Acrylate ("EHA") | $T_g$ = −85° C. (Monomer) | MilliporeSigma |
| Cyclohexyl Acrylate ("CHA") | $T_g$ = 19° C.; ≥98% by GC (Monomer) | TCI America in Portland, OR |
| VISIOMER MEEU 25M | N-(2-Methacryloyloxyethyl) ethylene urea, 25 wt-% in methyl methacrylate (Monomer) | Evonik Industries AG, Parsippany, NJ |
| Iso-Butyl Acrylate ("i-BuA") | $T_g$ = −24° C. (Monomer) | BASF Corporation |
| Iso-Bornyl Acrylate ("i-BnA") | $T_g$ = 94° C.; ≥90% by GC (Monomer) | TCI America |
| t-Butyl Hydroperoxide | Initiator (Oxidizer) | United Initiators in Pullach, Germany |
| Erythorbic Acid | Initiator (Reducer) | MilliporeSigma |
| SIPOMER PAM 4000 | Phosphoric acid 2-hydroxyethyl methacrylate ether, $T_g$ = 55° C. (Monomer) | Solvay in Alpharetta, Georgia |
| DISSOLVINE E-FE-13 7 wt-% aqueous solution | Ethylenediaminetetraacetic acid ferric-sodium complex (Catalyst) | Akzo Nobel in Chicago, IL |
| n-Dodecyl Mercaptan | (Chain Transfer Agent) | MilliporeSigma |
| Ammonium hydroxide | 26 Degree Baumé, 29 wt-% active ammonia (Volatile Base) | Viking Chemical Company in Rockford, IL |
| NUOSEPT 498 | 1,2-benzisothiazolin-3-one aqueous dispersion (Biocide) | Troy Corporation in Florham Park, NJ |
| AQUAFLOW NHS-310 | Hydrophobically modified polyether, 20 wt-% aqueous dispersion (Non-ionic associative Thickener) | Ashland Inc. in Covington, KY |
| ACRYSOL RM-8W | Hydrophobically modified ethylene oxide urethane, 18 wt-% aqueous dispersion (Non-ionic Thickener) | Dow Chemical in Midland, MI |
| EPS 9147 | (Low VOC Coalescent; proprietary composition) | Engineered Polymer Solutions in Marengo, IL |
| TEXANOL | 2,2,4-trimethyl-1,3-pentanediol monoisobutyrate >99%; 2,2,4-trimethyl-1,3-pentanediol diisobutyrate ≤0.8% | Eastman Chemical Company, Kingsport, TN |
| TAMOL 165A | Ammonium salts of polycarboxylates (Hydrophobic Copolymer Dispersant) | Dow Chemical |
| DREWPLUS L-475 | Distillates (petroleum), solvent-dewaxed heavy paraffinic; CAS#: 64742-65-0 (Defoamer) | Ashland Inc. |
| STRODEX NB-20 | Mixture of alkyl phenol ethers: Polyoxyethylene octyl phenyl ether (95 wt-%), Poly(oxy-1,2-ethanediyl), alpha-(nonylphenyl)-omega-hydroxy-, branched, phosphates, sodium salts (2.9 wt-%), nonylphenol branched polyethoxylate (1.7 wt-%). (Surfactant) | Ashland Inc. |
| AMP-95 | 2-amino-2-methyl-1-propanol containing 5 wt-% added water (Base) | ANGUS Chemical in Buffalo Grove, IL |
| CAMEL-WHITE | Calcium carbonate (Pigment) | Imerys Carbonates in Paris, France |
| SURFYNOL 104A | 2,4,7,9-Tetramethyldec-5-yne-4,7-diol, 50 wt-% solution in 2-Ethylhexan-1-ol (Surfactant/Dispersant) | Evonik AG |
| KRONOS 4311 | Rutile titanium dioxide slurry, 77 wt-% solids (Pigment) | Kronos Worldwide, Inc. in Dallas, TX |
| MINEX 4 | Micronized nepheline syenite, median diameter 6.8 μm (Filler/extender) | Unimin Corporation in New Canaan, CT |
| DIAFIL 525 | Natural diatomite powder, median particle size 12 μm (Matting Agent) | Imerys |
| ATTAGEL 50 | Micronized attapulgite powder, average particle size 0.1 μm. (Rheology Modifier) | BASF Corporation |
| Sodium Nitrite | 4 wt-% dissolved in DI water (Corrosion Inhibitor) | MilliporeSigma |
| OPTIFLO L1400 | 20 wt-% in water (Associative HEUR Thickener) | BYK in Wallingford, CT |

Examples 1-4 and Comparative Examples 5-6

Examples 1-6 were 2-stage latexes prepared according to the Latex Preparation Procedure A for a two-stage latex, using the Example 1-6 components as indicated in TABLE 1 above. Examples 1-6 included 1 wt-%, 2 wt-%, 5 wt-%, 10 wt-%, 20 wt-%, and 30 wt-% of tBA, respectively, based on total weight of monomers.

Comparative Examples 7-9

Examples 7-9 were 2-stage latexes prepared according to the Latex Preparation Procedure B for a two-stage latex, using the Example 7-9 components as indicated in TABLE 2 above. Example 7 included 30 wt-% of tBA in monomer emulsion 1 and 10 wt-% of tBA in monomer emulsion 2, based on total weight of monomers. Example 8 included 30 wt-% of tBA in monomer emulsion 1 and 20 wt-% of tBA in monomer emulsion 2, based on total weight of monomers. Example 9 included 30 wt-% of tBA in monomer emulsion 1 and 32 wt-% of tBA in monomer emulsion 2, based on total weight of monomers.

Example 10

Example 10 was a powerfeed latex prepared according to the Latex Preparation Procedure C for a powerfeed latex, using the Example 10 components (same as Example 4 components) as indicated in TABLE 1 above. Example 10 included 10 wt-% of tBA based on total weight of monomers.

Examples 11-12 and Comparative Examples 13-14

Examples 11-14 were 2-stage latexes prepared according to the Latex Preparation Procedure A for a two-stage latex, using the Example 11-14 components as indicated in TABLE 1 above. Example 11 included 10 wt-% of iso-bornyl acrylate based on total weight of monomers. Example 12 included 10 wt-% of cyclohexyl acrylate based on total weight of monomers. Example 13 included 10 wt-% of iso-butyl acrylate based on total weight of monomers. Example 14 included 10 wt-% of t-butyl methacrylate based on total weight of monomers.

Comparative Example 15

Example 15 was a 2-stage latex prepared according to the Latex Preparation Procedure A for a two-stage latex, using the Example 15 components as indicated in TABLE 1 above.

The volume average particle size, resin solids, and pH of each of the Examples 1-15 were recorded and are shown in TABLE 3 below.

Examples 16-17 and Comparative Examples 18

Examples 16-18 were single-stage latexes prepared according to the Latex Preparation Procedure D for a single-stage latex, using the Example 16-18 components as indicated in TABLE 3 above. Example 16 included 5 wt-% of tert-butyl acrylate based on total weight of monomers. Example 17 included 10 wt-% of tert-butyl acrylate based on total weight of monomers.

The volume average particle size, resin solids, and pH of each of the Examples 1-15 were recorded and are shown in TABLE 3 below.

TABLE 4

Latex Properties

| Example Number | Vol. Ave. Particle Size (nm) | Resin Solids | pH |
|---|---|---|---|
| Example 1 | 88 | 45.8 | 8.3 |
| Example 2 | 85 | 45.7 | 8.2 |
| Example 3 | 87 | 45.2 | 8.3 |
| Example 4 | 87 | 45.5 | 8.4 |
| Example 5 (Comparative) | 87 | 45.8 | 8.3 |
| Example 6 (Comparative) | 89 | 45.4 | 8.2 |
| Example 7 (Comparative) | 91 | 44.9 | 8.4 |
| Example 8 (Comparative) | 92 | 45.2 | 8.2 |
| Example 9 (Comparative) | 92 | 45.3 | 8.3 |
| Example 10 | 84 | 45.0 | 8.6 |
| Example 11 | 89 | 45.4 | 8.6 |
| Example 12 | 89 | 45.6 | 8.5 |
| Example 13 (Comparative) | 87 | 45.3 | 8.6 |
| Example 14 (Comparative) | 87 | 45.5 | 8.5 |
| Example 15 (Comparative) | 86 | 45.4 | 8.4 |
| Example 16 | 85 | 45.4 | 8.8 |
| Example 17 | 85 | 45.1 | 8.7 |
| Example 18 (Comparative) | 85 | 45.2 | 8.7 |

Each of the Examples was prepared into a primer formulation (labelled "Example 1 Primer," "Example 2 Primer," etc. made with the respective Example latex above) and used for further testing.

General Procedure for Two-Stage Primer Formula

A flat primer formula was prepared by adding a pigment grind to a stirring Example latex, followed by the addition of let down ingredients. The pigment grind was prepared by sequentially adding, in the order listed and under constant mixing with a Cowles blade to maintain a vortex, 100 g of water, 5 g of ATTAGEL 50, 11 g of TAMOL 165A, 1 g of STRODEX NB-20, 3 g of AMP-95, 3.5 g of DREWPLUS L-475, 150 g of Ti-Pure R-706, 150 g of CAMEL-WHITE, and 2 g of water. The grind was added to 498 g of stirring Example latex in a quart-size can and the mixture was agitated for 20 minutes. Let down ingredients were added, sequentially in the order listed, to the pigmented Example latex: EPS 9147 coalescent (see TABLE 4 for amounts), 1.5 g of NUOSEPT 498, 1.2 g of 4% aqueous sodium nitrite, 112 g of water, 6 g of AQUAFLOW NHS-310, and ACRYSOL RM-8W (see TABLE 4 for amounts) to afford a flat primer formulation with a KU viscosity of 100±3.

The amounts of the coalescent and rheology modifiers, TEXANOL coalescent and ACRYSOL RM-8W, were adjusted for each Example latex to achieve coalescence below 50° F. and a KU viscosity range of 100±3. The levels used are listed in TABLE 4.

TABLE 5

Coalescent and Rheology Modifiers.

| Example Number | EPS 9147 | ACRYSOL RM-8W |
|---|---|---|
| Example 1 Primer | 18 | 1.4 |
| Example 2 Primer | 17 | 1.4 |
| Example 3 Primer | 18 | 1.5 |
| Example 4 Primer | 15 | 1.5 |
| Example 5 Primer (Comparative) | 12 | 1.5 |
| Example 6 Primer (Comparative) | 10 | 1.7 |
| Example 7 Primer (Comparative) | 6 | 2.1 |
| Example 8 Primer (Comparative) | 6 | 2.0 |
| Example 9 Primer (Comparative) | 6 | 2.1 |
| Example 10 Primer | 15 | 1.5 |
| Example 11 Primer | 15 | 1.5 |
| Example 12 Primer | 17 | 1.5 |

TABLE 5-continued

Coalescent and Rheology Modifiers.

| Example Number | EPS 9147 | ACRYSOL RM-8W |
|---|---|---|
| Example 13 (Comparative) | 14 | 1.5 |
| Example 14 Primer (Comparative) | 16 | 1.6 |
| Example 15 Primer (Comparative) | 16 | 1.6 |

General Procedure for Single-Stage Primer Formula

A flat primer formula was prepared by adding a pigment grind to a stirring Example latex, followed by the addition of let down ingredients. The pigment grind was prepared by sequentially adding, in the order listed and under constant mixing with a Cowles blade to maintain a vortex, 100 g of water, 5 g of ATTAGEL 50, 11 g of TAMOL 165A, 1 g of STRODEX NB-20, 3 g of AMP-95, 3.5 g of DREWPLUS L-475, 150 g of Ti-Pure R-706, 150 g of CAMEL-WHITE, and 2 g of water. The grind was added to 498 g of stirring Example latex in a quart-size can and the mixture was agitated for 20 minutes. Let down ingredients were added, sequentially in the order listed, to the pigmented Example latex: Texanol coalescent (see TABLE 6 for amounts), 1.5 g of NUOSEPT 498, 1.2 g of 4% aqueous sodium nitrite, 112 g of water, 6 g of AQUAFLOW NHS-310, and ACRYSOL RM-8W (see TABLE 4 for amounts) to afford a flat primer formulation with a KU viscosity of 95±3.

The amounts of the coalescent and rheology modifiers, EPS® 9147 coalescent and ACRYSOL RM-8W, were adjusted for each Example latex to achieve coalescence below 50° F. and a KU viscosity range of 95±3. The levels used are listed in TABLE 6.

TABLE 6

Coalescent and Rheology Modifiers.

| Example Number | Texanol | ACRYSOL RM-8W |
|---|---|---|
| Example 16 Primer | 19.4 | 2.4 |
| Example 17 Primer | 17.4 | 1.7 |
| Example 18 Primer (Comparative) | 19.4 | 1 |

Flat Paint Formulation

A flat paint formulation was prepared for use in the Stainblocking Test. A pigment grind was added to a stirring EPS 2741 latex, followed by the addition of let down ingredients. The pigment grind was prepared by sequentially adding, in the order listed and under constant mixing with a Cowles blade to maintain a vortex, 75 g of water, 6 g of TAMOL 165A, 2 g of SURFYNOL 104A, 2 g of DREWPLUS L-475, 3 g of ATTAGEL 50, 3 g of NUOSEPT 498, 327 g of KRONOS 4311, 115 g of MINEX 4, and 60 g of DIAFIL 525. The grind was added to 537 g of EPS 2741 latex stirring in a quart-size can and the mixture was agitated for 20 minutes. Let down ingredients were added, sequentially in the order listed, to the pigmented EPS 2741 latex: 1 g of ammonium hydroxide, 11 g of EPS 9147 coalescent, 1 g of DREWPLUS L-475, 10 g of 4% aqueous sodium nitrite, 7.5 g of OPTIFLO L1400, 1 g of ACRYSOL RM-8W, and 7 g of DI water, to afford a flat primer formulation with a KU viscosity of 95.

Stainblocking Test

Preparation of Stained Samples. On a smooth, flat substrate (Leneta Scrub Test Panel, P-121-10N, available from Paul N. Gardner Company in Pompano Beach, Fla.), Flat Paint Formulation was applied as a 7 mil (0.1778 mm) wet film basecoat using a U-shaped applicator (#2230, available from BYK-Gardner USA in Columbia, Md.). The applied basecoat was allowed to dry for at least 24 hr at room temperature. On the dried basecoat, various staining agents—water-washable black, blue, and green markers (MARKS-A-LOT marker in color black from Avery Products Corp. in Brea, Calif.; CRAYOLA Window Marker in colors blue and green from Crayola LLC in Forks Township, Pa.) were applied and allowed to dry for at least 12 hr.

Preparation of Unstained Sample. An unstained sample was prepared by applying the Flat Paint Formulation onto the substrate as a 6 mil (0.1524 mm) wet film, which was air dried at room temperature for at least 24 hr. This was used for standardizing the spectrophotometer.

Application of Primer and Paint. The Example primer formulations (Example Primer 1—Example Primer 15) were applied over the stained areas using a 3 mil (0.0762 mm) square applicator (4 inch (101.6 mm) width, AP-B5356, Paul N. Gardner Company). The primer coat was allowed to dry for 6 hr at room temperature. A top coat of Flat Paint Formulation was applied over the dried primer coat using a 6 mil (0.1524 mm) square applicator (3 inch (0.0762 mm) width, AP-B5353, Paul N. Gardner Company). The top coat was allowed to dry for at least 1 day before colorimetric measurements were taken. The unstained sample was treated in the same way.

Measurements. The appearance of color in the top coat of the stained samples was compared to the unstained sample. A calibrated Datacolor Check III spectrophotometer (Lawrenceville, N.J.) was used to measure the baseline color of the unstained sample. A second measurement was performed over a stained area of interest to give the color difference (expressed in $\Delta E$) between the stained and stain-free regions. The stainblocking results, shown in TABLE 5 below, are averages of at least two repeat measurements. A lower $\Delta E$ value indicates better stainblocking performance.

TABLE 7

Stainblocking Results.

| Example Number | Weight Percent (wt-%) Meth(acrylic Acid Ester Monomer | $\Delta E$ over marker stains | | |
|---|---|---|---|---|
| | | Black | Blue | Green |
| Example 1 Primer | 1 wt-% tBA | 19.3 | 14.0 | 9.3 |
| Example 2 Primer | 2 wt-% tBA | 16.7 | 14.2 | 11.4 |
| Example 3 Primer | 5 wt-% tBA | 13.8 | 11.3 | 9.2 |
| Example 4 Primer | 10 wt-% tBA | 17.0 | 15.4 | 10.9 |
| Example 5 Primer (Comparative) | 20 wt-% tBA | 21.1 | 20.0 | 14.5 |
| Example 6 Primer (Comparative) | 30 wt-% tBA | 21.8 | 20.4 | 15.9 |
| Example 7 Primer (Comparative) | 40 wt-% tBA | 23.2 | 20.7 | 15.1 |
| Example 8 Primer (Comparative) | 50 wt-% tBA | 22.1 | 21.6 | 15.4 |
| Example 9 Primer (Comparative) | 62 wt-% tBA | 21.8 | 21.1 | 14.5 |
| Example 10 Primer | 10 wt-% tBA | 14.0 | 11.7 | 10.2 |
| Example 11 Primer | 10 wt-% i-BnA | 12.5 | 11.1 | 8.4 |
| Example 12 Primer | 10 wt-% CHA | 17.6 | 14.3 | 11.4 |
| Example 13 Primer (Comparative) | 10 wt-% i-BuA | 19.4 | 17.5 | 13.9 |
| Example 14 Primer (Comparative) | 10 wt-% tBMA | 18.2 | 17.0 | 13.9 |
| Example 15 Primer (Comparative) | — | 19.3 | 17.5 | 14.1 |

TABLE 7-continued

Stainblocking Results.

| Example Number | Weight Percent (wt-%) Meth(acrylic Acid Ester Monomer | ΔE over marker stains | | |
|---|---|---|---|---|
| | | Black | Blue | Green |
| Example 16 Primer | 5 wt-% tBA | 14.2 | 7.2 | 8.1 |
| Example 17 Primer | 10 wt-% tBA | 12.9 | 6.6 | 5.1 |
| Example 18 Primer (Comparative) | — | 15.2 | 9.7 | 8.2 |

General Procedure for Adhesion Test

This adhesion test uses the ASTM 3359 cross-cut adhesion method. Each Example primer containing an Example latex was applied as a 3 mil (0.0762 mm) wet film on the following substrates: 3 foot (0.914 m) sanded cedar panel, and dull matte steel (R-48, 4 inch×8 inch (101.6 mm×203.2 mm), Q-Lab). The Example primers were applied on the cedar panels and the R-48 steel panels using a #5554 applicator from BYK-Gardner USA. After air drying for 24 hr, each paint film was perpendicularly cross-cut using a 6-line, 2-millimiter (2-mm) template with an OLFA Slimline Knife (available from OLFA Corp. in Rosemont, Ill.) with a fresh sharp blade. A 3-inch (76.2 mm) piece of ELCOMETER 99 adhesive test tape (available from Elcometer in Warren, Mich.) was applied to the cross-cut region and peeled off at 180° angle, and the resulting film removal was rated as specified in ASTM 3359 Method B. The adhesion results are shown in TABLE 6 below. The range of the adhesion test score is from 0 to 5, with higher numbers indicating higher adhesion.

König Pendulum Hardness Test

Each primer containing an Example Latex was applied as a 10 mil (0.254 mm) wet film on a 4 inch×6 inch×0.25 inch (101.6 mm×152.4 mm×6.35 mm) smooth glass plate and allowed to air dry for 24 hr at ambient temperature. The one-day hardness was recorded on a BYK König pendulum hardness tester using a 3° angle. A second hardness value was measured after air drying at ambient temperature for 7 days. The König hardness data, shown in TABLE 6, are averages of three repeat measurements. A higher König hardness value indicates higher hardness.

TABLE 8

Adhesion and Hardness Test Results.

| Example Number | König hardness | | Adhesion, 1 day | |
|---|---|---|---|---|
| | 1-day | 7-day | Sanded Cedar Panel | Dull Matte Steel |
| Example 1 Primer | 6 | 6 | 4 | 5 |
| Example 2 Primer | 6 | 6 | 5 | 5 |
| Example 3 Primer | 5 | 5 | 5 | 5 |
| Example 4 Primer | 6 | 6 | 5 | 5 |
| Example 5 Primer (Comparative) | 7 | 7.6 | 4 | 5 |
| Example 6 Primer (Comparative) | 8 | 8 | 2 | 5 |
| Example 7 Primer (Comparative) | 8.3 | 9 | 4 | 4 |
| Example 8 Primer (Comparative) | 7 | 8 | 5 | 4 |
| Example 9 Primer (Comparative) | 6 | 7 | 5 | 4 |
| Example 10 Primer | 4 | 5 | 5 | 4 |
| Example 11 Primer | 4 | 5 | 5 | 4 |
| Example 12 Primer | 6 | 7 | 5 | 4 |
| Example 13 Primer (Comparative) | 6 | 7 | 5 | 4 |
| Example 14 Primer (Comparative) | 5.6 | 6 | 5 | 4 |
| Example 15 Primer (Comparative) | 7 | 7 | 5 | 4 |
| Example 16 Primer | 6 | 7 | 4 | 5 |
| Example 17 Primer | 6 | 7 | 4 | 5 |
| Example 18 Primer (Comparative) | 6 | 7.5 | 4 | 5 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An aqueous coating composition comprising a stainblocking polymer comprising:
   at least 10 wt-%, based on the total weight of the composition, of a stain-blocking emulsion latex polymer comprising interpolymerized monomers comprising:
      at least 1 wt-% to less than 20 wt-% of one or more acrylic acid ester monomers selected from isobornyl acrylate, cyclohexyl acrylate, t-butyl acrylate, and combinations thereof;
      at least 10 wt-% of one or more (meth)acrylate monomers selected from n-butyl (meth)acrylate, ethylhexyl (meth)acrylate, methyl (meth)acrylate, and combinations thereof;
      optionally, one or more wet adhesion monomers; and
      optionally, styrene;
      wherein the weight percentages in the polymer are based on the total weight of the interpolymerized monomers;
   an aqueous carrier; and
   optionally, one or more additives selected from a surfactant, thickener, coalescent, biocide, mildewcide, colorant, and combinations thereof.

2. The composition of claim 1 wherein the one or more acrylic acid ester monomers is t-butyl acrylate.

3. The composition of claim 1 wherein the interpolymerized monomers comprise: at least 2 wt-% and up to 15 wt-% of the one or more acrylic acid ester monomers.

4. The composition of claim 3 wherein the interpolymerized monomers comprise: at least 5 wt-% and up to 10 wt-% of the one or more acrylic acid ester monomers.

5. The composition of claim 1 wherein the interpolymerized monomers comprise 10 wt-% to 99 wt-% of the one or more (meth)acrylate monomers.

6. The composition of claim 1 wherein the interpolymerized monomers comprise styrene.

7. The composition of claim 6 wherein the interpolymerized monomers comprise 1 wt-% to 75 wt-% styrene.

8. The composition of claim 1 wherein the latex polymer is a multistage latex comprising at least two polymer portions with different Tg values, where the difference in Tg (ΔTg) is at least 35° C.

9. The composition of claim 1 wherein the latex polymer is a multistage latexcomprising at least two polymer portions with different Tg values, where the difference in Tg (ΔTg) is less than 200° C.

10. A stained substrate having the composition of claim 1 coated thereon.

11. An aqueous coating composition comprising a stain-blocking polymer comprising:
    at least 10 wt-%, based on the total weight of the composition, of a stain-blocking emulsion latex polymer comprising interpolymerized monomers comprising:
        at least 2 wt-% and up to 15 wt-% of t-butyl acrylate;
        at least 10 wt-% of one or more (meth)acrylate monomers selected from n-butyl (meth)acrylate, ethylhexyl (meth)acrylate, methyl (meth)acrylate, and combinations thereof;
        optionally, one or more wet adhesion monomers; and optionally, styrene;
        wherein the weight percentages in the polymer are based on the total weight of the interpolymerized monomers;
    an aqueous carrier; and
    optionally, one or more additives selected from a surfactant, thickener, coalescent, biocide, mildewcide, colorant, and combinations thereof.

12. The composition of claim 11 wherein the interpolymerized monomers comprise: at least 5 wt-% and up to 10 wt-% of t-butyl acrylate.

13. The composition of claim 11 wherein the interpolymerized monomers comprise 10 wt-% to 99 wt-% of the one or more (meth)acrylate monomers.

14. A stained substrate having the composition of claim 11 coated thereon.

15. A method comprising:
    causing an aqueous coating composition comprising a stain-blocking polymer to be applied to a stained substrate, wherein the stain-blocking polymer is an emulsion latex polymer comprising interpolymerized monomers comprising:
        at least 1 wt-% to less than 20 wt-% of one or more acrylic acid ester monomers selected from isobornyl acrylate, cyclohexyl acrylate, t-butyl acrylate, and combinations thereof;
        at least 10 wt-% of one or more (meth)acrylate monomers selected from n-butyl (meth)acrylate, ethylhexyl (meth)acrylate, methyl (meth)acrylate, and combinations thereof;
        optionally, one or more wet adhesion monomers; and optionally, styrene;
        wherein the weight percentages in the polymer are based on the total weight of the interpolymerized monomers.

16. The method of claim 15 wherein the one or more acrylic acid ester monomers is t-butyl acrylate.

17. The method of claim 15 wherein the interpolymerized monomers comprise: at least 2 wt-% and up to 15 wt-% of the one or more acrylic acid ester monomers.

18. The method of claim 17 wherein the interpolymerized monomers comprise: at least 5 wt-% and up to 10 wt-% of the one or more acrylic acid ester monomers.

19. The method of claim 15 wherein the interpolymerized monomers comprise 10 wt-% to 99 wt-% of the one or more (meth)acrylate monomers.

20. The method of claim 15 wherein the interpolymerized monomers comprise styrene.

* * * * *